United States Patent [19]

Goolcharan

[11] Patent Number: 5,528,286
[45] Date of Patent: Jun. 18, 1996

[54] TELECOMMUNICATION SYSTEM FOR TRANSMITTING FULL MOTION VIDEO

[75] Inventor: Boysie M. Goolcharan, Downey, Calif.

[73] Assignee: Christine Holland Trustee/Goolcharan Trust, Houston, Tex.

[*] Notice: The term of this patent shall not extend beyond the expiration date of Pat. No. 5,283,637.

[21] Appl. No.: 177,704

[22] Filed: Jan. 4, 1994

Related U.S. Application Data

[63] Continuation of Ser. No. 570,297, Aug. 20, 1990, Pat. No. 5,283,637.

[51] Int. Cl.[6] .................................................. H04M 11/00
[52] U.S. Cl. .................................................. 348/19; 348/17
[58] Field of Search .................................. 348/17, 18, 19, 348/14, 15, 16

[56] References Cited

U.S. PATENT DOCUMENTS

| | | |
|---|---|---|
| 3,578,911 | 5/1971 | Bender et al. . |
| 3,814,867 | 6/1974 | Boucher . |
| 3,829,626 | 8/1974 | Irwin et al. . |
| 3,974,337 | 8/1976 | Tatsuzawa . |
| 4,054,910 | 10/1977 | Chou . |
| 4,357,494 | 11/1982 | Chambers, Jr. . |
| 4,785,265 | 11/1988 | Molnar et al. . |
| 4,996,497 | 2/1991 | Waehner . |
| 5,249,224 | 9/1993 | Chambers . |

OTHER PUBLICATIONS

IEEE Symposium, 1976 Simultaneous Transmission of Multichannel Telephone and Video–Telephone Signal By Analog Multiplex—Authors: T. Kawafune and Y. Yamamoto.

*Primary Examiner*—Jason Chan
*Assistant Examiner*—Stella L. Woo
*Attorney, Agent, or Firm*—Charles H. Thomas

[57] ABSTRACT

An improved telecommunication system is provided which allows the transmission of full motion color video, voice and data over a communications link formed of a twisted pair of wires of the type currently utilized only for voice and data communications. The signal is transmitted over the twisted pair link as a broadband signal up to a distance of six thousand feet. The twisted pair link exhibits a known impedance to the signal, depending upon the lengths of the twisted pairs of wires in the link. As the signal is received from the twisted pair link it is amplified and an impedance proportional to the impedance of the twisted pair link and vectorially opposite thereto is impressed thereon. A unity gain is achieved whereby the signal degrading effects of the impedance of the twisted pair link are reversed. This results in the accurate reproduction of a video signal over a link including significant lengths of conventional twisted pairs of telephone wires. Moreover, because the compensation for telephone line twisted pair impedance allows the accurate reproduction of a broadband signal, a plurality of different video, telephone and data signals can be multiplexed together and transmitted simultaneously over the same twisted pair link.

1 Claim, 13 Drawing Sheets

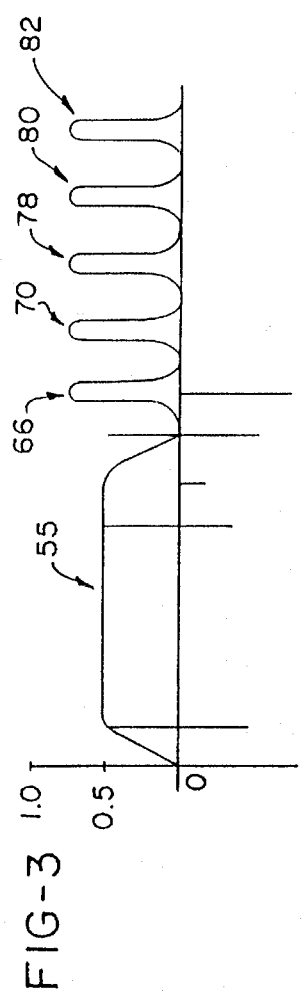
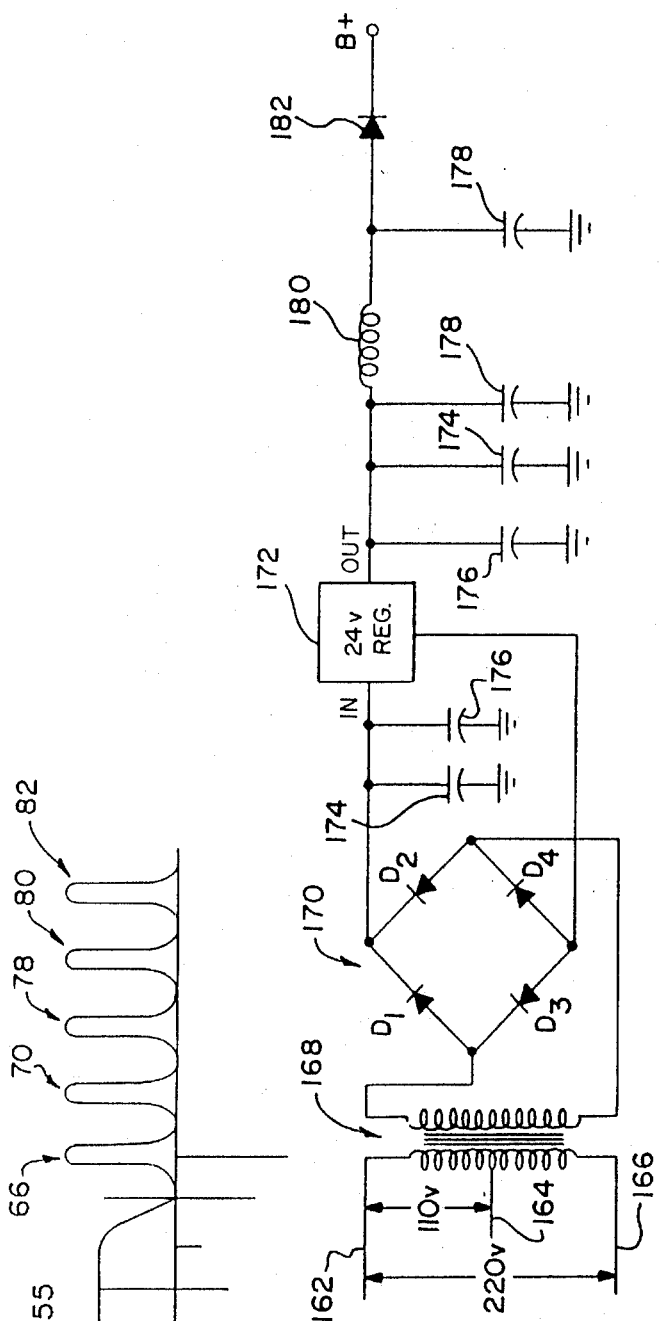
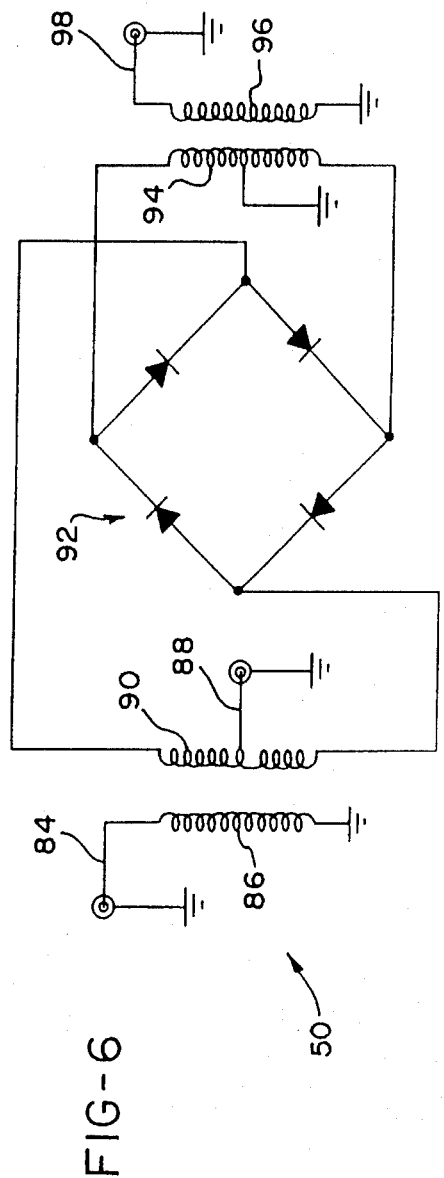
FIG-3
FIG-5
FIG-6

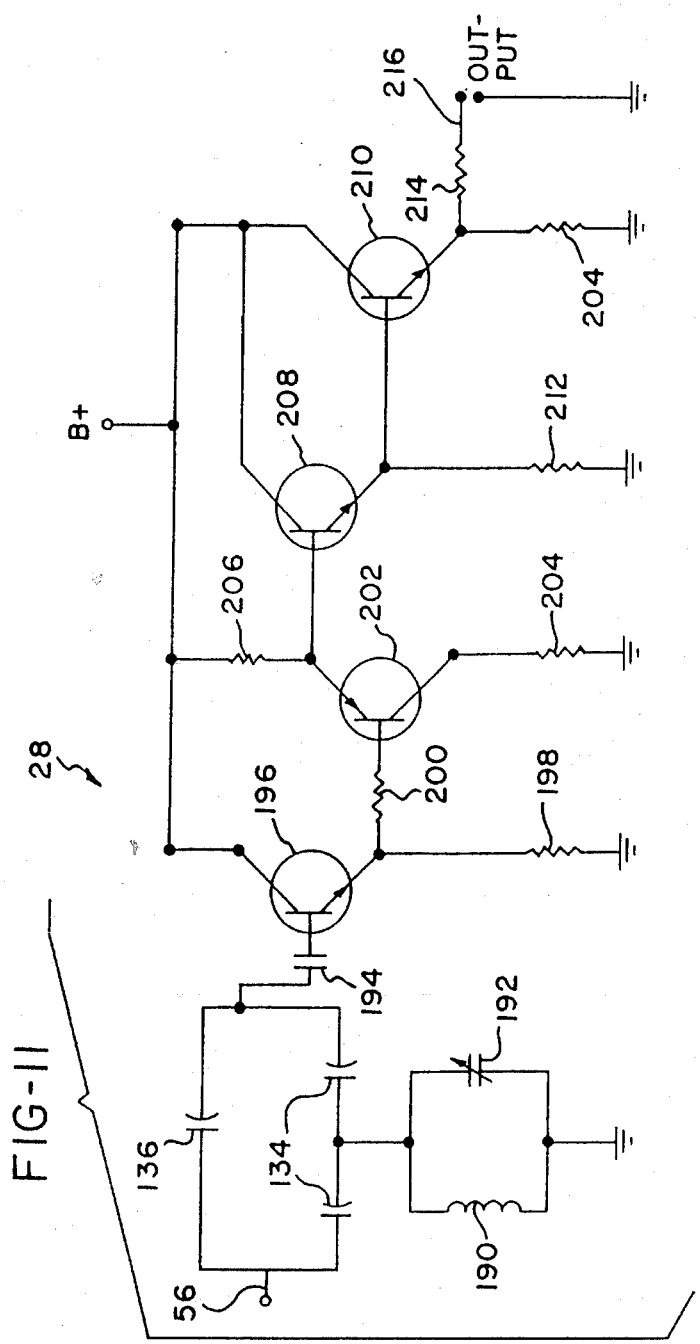
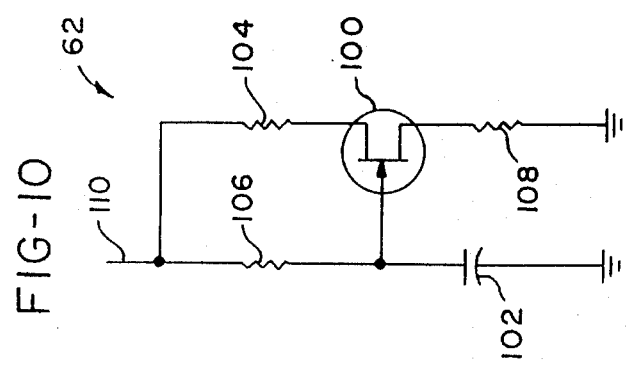

TELECOMMUNICATION SYSTEM FOR TRANSMITTING FULL MOTION VIDEO

The present application is a continuation of U.S. application Ser. No. 570,297 filed Aug. 20, 1990, now U.S. Pat. No. 5,283,637.

BACKGROUND OF THE INVENTION

1. Description of the Prior Art

The present invention is a system for transmitting multiple communication signals, including at least one video signal, simultaneously over a link formed of a twisted pair of telephone wires.

2. Field of the Invention

In conventional telecommunication systems the transmission of full motion video images has heretofore been possible only over communication links especially adapted for broadband transmission, as contrasted with the bandwidth of signals employed in the transmission of telephone communications. The transmission of voice signals in telephone communications requires a bandwidth of about 4 kilohertz. This bandwidth will accommodate frequencies within the range of the human voice and the frequencies of dial and pulse code tones used for establishing connections.

To meet the requirement for providing telephone service to communities throughout this country and throughout the world an infrastructure of telephone lines has been established from telephone central offices to subscriber locations. In many countries including this country such telephone lines are formed of lengths of twisted pairs of insulated copper wires of 16, 22, 24 or 26 gauge (AWG). Incalculable lengths of such twisted pairs of telephone wires have been installed by suspension from telephone poles and in buried conduits to link subscriber locations to telephone central offices, which in turn are linked throughout the country and throughout the world by telephone communications networks.

Due to the impedance of a link formed of a twisted pair of telephone wires there is always an attenuation of the electrical communication signals transmitted over these wires. The extent of this attenuation depends upon the length of the twisted pair link. That is, the longer the length of the twisted pair link the greater will be the total impedance between the central office and the subscriber's handset.

It is desirable in conventional telephone systems to create a uniformity in the attenuation of a signal from a subscriber location so that all of the telephone signals reaching a central office can be uniformly amplified and processed through the same type of common carrier equipment. The attenuation in a conventional link formed of a twisted pair of telephone wires below a prescribed frequency can be reduced and the lost frequency characteristic made nearly flat, by inserting series inductance periodically. This practice of inserting inductance periodically is termed loading. It has been conventional practice to load twisted pairs of telephone wires at intervals of six thousand feet where the wires are designed to conduct frequencies of from 0 to 4 kilohertz. The loading coils are normally located in manholes and in elevated equipment boxes on telephone poles. The conventional loading practice provides a relatively uniform signal level at telephone central offices from subscriber locations located at varying distances from the central offices.

while conventional telephone lines formed of twisted pairs of wire are suitable for the transmission of voice communications between telephone handsets and also for data communications, such as between computers and facsimile machines, the transmission of video signals over conventional telephone lines including twisted pair links has heretofore been impractical. Unlike voice and data communications which require a bandwidth of only about 4 kilohertz, the transmission of full motion video signals, such as television signals, requires a bandwidth of a minimum of 4.5 megahertz. In telephone communications systems in this country the Federal Communications Commission requires telephone communication carriers to allocate a bandwidth of 6 megahertz for the transmission of television signals. In other countries, such as in Europe, a bandwidth of 7.5 megahertz is required.

The reason that a video signal requires a bandwidth far greater than a voice signal is because of the multitude of points which must be scanned in a horizontal scanning raster in order to convey a video picture. At the end of each scan a blanking pulse is generated with respect to the video information to be reproduced, and a line synchronizing pulse of a polarity opposite to the video information is generated during this blanking pulse. The line pulses synchronize the individual horizontal scanning lines. Similarly, it is necessary to synchronize the field or vertical scans. This is done by another pulse train which occurs during the field retrace time.

In conventional full motion or "fast scan" television transmission, the time interval from the start of one horizontal line to the next is 63.5 microseconds. Each complete frame consists of two interlaced fields. The frame rate is 30 per second and there are 525 scanning lines per frame, of which about 93 are visible because of the loss of time during the field blanking pulse. To make a horizontal resolution approximately equal to a vertical resolution, a minimum bandwidth of about 4.5 megahertz is required. This frequency range and above will hereinafter be referred to as a broadband frequency spectrum, as contrasted with the narrow band frequency spectrum of 4 kilohertz which is employed in voice and data transmission.

Conventional lines currently employed in the infrastructure of telephone communications have heretofore been considered unsatisfactory for the transmission of video signals due to the degradation which video signals experience in passing over a conventional twisted pair of telephone wires. For a length of more than about one thousand feet, the horizontal sync pulses of a video signal lose their definition and become intermixed with the video data. As a consequence, the receiver cannot distinguish between horizontal scan lines. Also, the portions of the signals near the upper and lower ends of the frequency band experience far greater degradation than the portions of the signals near the middle of the band. Since color information is transmitted at the upper end of the frequency band of a video signal, color quickly becomes lost in transmission of a video signal over links including conventional twisted pairs of telephone wires. Thus, the transmission of full motion televised video signals, especially color video, has heretofore required broadband carrier facilities. The existing infrastructure of telephone communications lines has heretofore been considered unacceptable for the transmission of full motion video signals.

SUMMARY OF THE INVENTION

A primary object of the present invention is to provide a telecommunication system employing the medium of a link of one or more lengths of twisted pairs of telephone wires for use in transmitting full motion video signals. The telecommunication system of the invention thereby allows a television camera to transmit a video signal over a conventional twisted pair of telephone wires.

By providing a system for transmitting video signals over communication links employing conventional twisted pairs of telephone wires, the invention allows video signals to be transmitted over the existing infrastructure of telephone communication lines that are in place and operating throughout virtually all population centers. The invention dispenses with the need for special purpose broadband carrier facilities to be routed into a building structure in order to transmit a video signal from that location.

In one broad aspect the present invention may be considered to be a telephone communication circuit for transmitting video signals comprising: video signal initiation means for providing a video signal of at least 4.5 megahertz bandwidth, line driver means coupled to the video signal initiation means to amplify the video signal, a link formed of a twisted pair of unloaded telephone wires having opposite ends one of which is coupled to receive the amplified video signal, symmetrical video transformer means coupled to the other of the ends of the twisted pair link to receive and amplify the video signal, correcting amplifier means coupled to receive the video signal from the symmetrical video transformer and to impress thereon an impedance proportional to the impedance in the twisted pair link and in vector opposition thereto to thereby correct the video signal for impedance degradation in said twisted pair link, and a video receiver coupled to the correcting amplifier means for receiving the corrected video signal.

In another broad aspect the invention may be considered to be an improvement in a telephone communication circuit including a twisted pair link comprised of an unloaded twisted pair of wires of a known length and having first and second ends. The improvement of the invention is comprised of a video signal provision means for providing a video signal having a bandwidth of at least 4.5 megahertz, line driver means interposed between the video signal provision means and the first end of the twisted pair link to amplify the video signal, whereby the twisted pair link exhibits a known impedance thereto, unity gain amplification means coupled to the second end of said twisted pair link to reproduce the video signal with a compensating impedance impressed thereon that is proportional and opposite to the known impedance, and a video receiver coupled to receive the video signal with the compensating impedance impressed thereon.

The principle of operation of the invention requires the pairs of telephone wires in the twisted pair link to be unloaded. This is easily done where the pair of wires is no greater than six thousand feet in length, since loads on such wires are normally imposed only at the subscriber location and at the telephone central office. Any loading on the twisted pair of telephone wires must be removed in order for the invention to function properly. If the twisted pair link is greater than six thousand feet, line amplifiers have to be employed at intervals of no greater than six thousand feet. The twisted pair link may either be formed of a single twisted pair of wires extending between two stations, the aggregate length of subscriber lines connected between subscriber locations and a common central office, or the aggregate length of subscriber lines connected between subscriber locations and different central offices.

In the absence of loading, a conventional twisted pair of telephone wires will exert a known impedance on a video signal transmitted over those wires. Since impedance is a transmission factor with a vector, it is possible to impose a corresponding, opposite impedance on the received signal before the signal is passed to the video receiver for display. The effects of impedance on the video signal are thereby reversed. Therefore, although the horizontal sync pulses of a video signal are degraded, as are the information bearing portions of the video signal at the upper and lower ends of the video signal band, the corrective impedance impressed on the received video signal has the greatest corrective effect on these portions of the video signal. As a consequence, once the opposing impedance has been impressed upon the received video signal, the signal is quite accurately reconstructed to its original form that it had upon its arrival at the transmitting end of the twisted pair of telephone wires.

Because it is possible to fully reconstruct a video signal, a conventional telephone twisted pair link is no longer limited to the narrow 4 kilohertz frequency band of voice and data transmission. To the contrary, broadband or wide band signals may be transmitted over conventional twisted pairs of telephone wires. The video signal transmitted over the telecommunication circuit of the invention preferably is provided by a video signal initiation means that has a bandwidth of at least about 6 megahertz. Thus, a video signal conforming to the Federal Communication Commission television channel requirements for monochrome and color television transmission may be transmitted according to the invention.

The correcting amplifier means which impresses the corrective impedance upon the received video signal is preferably comprised of a receive signal emitter follower amplification circuit and resistor-capacitor combinations which are selectively and alternatively strapped into the receive signal emitter follower amplification circuit as determined by the length of the twisted pair link. The correcting amplifier means is also comprised of phase adjustment means for applying a phase adjustment to the video signal. This phase adjustment means is formed of a phase adjustment amplifier circuit and resistor-capacitor inductor combinations which are selectively and alternatively strapped into the phase adjustment amplifier circuit as determined by the length of the twisted pair link.

The line driver means is preferably comprised of a gain selection means including a transmit signal emitter follower amplification circuit and resistor-capacitor combinations which are selectively and alternatively strapped into the transmit signal emitter follower amplification circuit as determined by the length of the twisted pair link. By providing the line driver means with selected resistor-capacitor combinations, the system can be adjusted so that the video signal is degraded more uniformly across its bandwidth as it is transmitted through the twisted pair of telephone wires, and is not excessively degraded at the upper and lower ends of the video signal frequency band. It thus is more easily corrected and reconstructed by the symmetrical video transformer means and the correcting amplifier means.

To take further advantage of the capability of broadband transmission now possible utilizing conventional twisted pair links according to the invention, preferred embodiments of the invention involve not only the transmission of a single video signal over a conventional twisted pair link, but also the multiplexing of a plurality of signals over a conventional twisted pair link. The plurality of signals are frequency modulated together at the transmitting end and demodulated at the receiving end of the telecommunication circuit. Indeed, a plurality of video signals, a plurality of voice signals, a plurality of data signals, and various combinations of video, voice and data signals can be transmitted over a single conventional twisted pair link comprised of telephone wires designed for use on an ordinary telephone handset using multiplexing techniques.

In such a multichannel system according to the invention the telecommunication circuit is comprised of not only a video signal initiation means but also at least one voice band signal initiation means for providing a voice band signal. Such a signal has a bandwidth of about 4 kilohertz. The system is further provided with multiplexing means coupled to receive the video signal from the video signal initiation means and the voice band signal from the voice band signal initiation means and to transmit the video signal and the voice band signal simultaneously through the line driver means and over the twisted pair link. In addition to the video receiver a voice band receiver is coupled to the correcting amplifier means for receiving the voice band signal.

The system of the invention may be utilized to transmit signals multiplexed together over a 10 megahertz bandwidth. Thus, for example, a video signal may be multiplexed together with a full duplex telephone voice signal of 4 kilohertz and further additional full duplex data signals, voice signals, or a combination of data and voice signals. Moreover, a plurality of video signals can be multiplexed together and transmitted utilizing the system of the invention. Indeed, by utilizing quadrature amplitude modulation techniques a total of four different video signals can be multiplexed together and transmitted over a single twisted pair link simultaneously.

The invention may be described with greater clarity and particularity with reference to the accompanying drawings.

DESCRIPTION OF THE DRAWINGS

FIG. 3 is a frequency diagram showing the different signals as modulated by the transmitting terminal of FIG. 2.

FIG. 5 is a schematic diagram of the direct current voltage supply for both the transmitting terminal of FIG. 2 and the receiving terminal of FIG. 4.

FIG. 6 is a schematic diagram of a double balanced mixing circuit employed in both the transmitting terminal of FIG. 2 and the receiving terminal of FIG. 4.

FIG. 10 is a schematic diagram of an oscillator circuit employed in both the transmitting circuit of FIG. 2 and the receiving circuit of FIG. 4.

FIG. 11 is a schematic diagram of a broadband amplifier circuit employed in the transmitting terminals of the telecommunication system of FIG. 1.

DESCRIPTION OF THE EMBODIMENT

Figure 1:
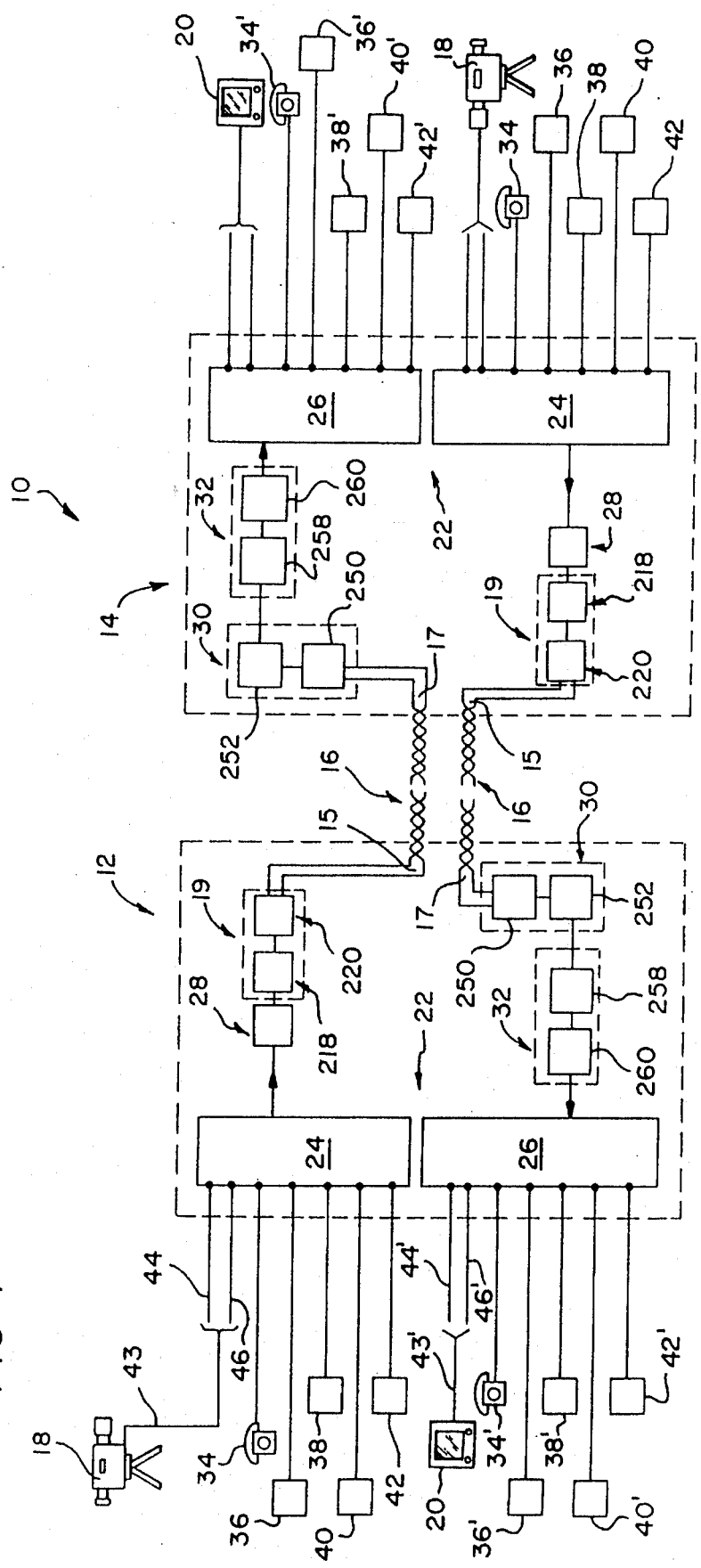
FIG. 1 is a block diagram of one embodiment of a full duplex, multiplexed telecommunication system constructed according to the invention.

FIG. 1 illustrates a telecommunication system indicated generally at 10. The telecommunication system 10 extends between a pair of stations 12 and 14, each having a transceiver, which are coupled together by twisted pair links 16 each comprised of an unloaded twisted pair of telephone wires.

Stations

At each of the stations 12 and 14 of the telecommunication system 10 there is a video signal source, indicated diagrammatically as a video camera 18 and also a video receiver indicated diagrammatically as a television receiver or monitor 20. The video signal source 18 has a signal frequency bandwidth of at least 4.5 megahertz and preferably at least 6.0 megahertz.

Each of the stations 12 and 14 is further comprised of a multiplexing unit 22 having a frequency modulating circuit 24 and a frequency demodulating circuit 26. The video signal source 18 is connected through the frequency modulating circuit 24 of the multiplexing unit 22 to a broadband amplification circuit 28. The broadband amplification circuit 28 is coupled to the video signal source 18 to receive the signal therefrom to produce an amplified signal. The broadband amplification circuit 28 is illustrated schematically in FIG. 11.

The unloaded twisted pair links 16 each have a length no greater than six thousand feet and a known impedance. The twisted pair links 16 are coupled to receive the amplified broadband signal from the broadband amplification circuit 28. The transmitters of each of the stations 12 and 14 are also each equipped with a line driver circuit 19 having circuit portions 218 and 220 which are illustrated respectively in schematic form in FIGS. 12a and 12b.

The receivers in each of the stations 12 and 14 are each provided with a symmetrical video transformer circuit 30 that is coupled to the twisted pair of telephone wires 16 to receive and amplify the broadband signal therefrom. Each symmetrical video circuit 30 includes circuit portions 250 and 252 which illustrated in FIGS. 13a and 13b respectively. Each of the stations 12 and 14 also includes a correcting amplifier means in the form of a correcting amplifier circuit 32. The correcting amplifier circuit 32 has circuit portions 258 and 260 which are respectively illustrated in FIGS. 14a and 14b.

The correcting amplifier circuit 32 is coupled to the symmetrical video transformer circuit 30 to provide an offsetting impedance to the broadband signal. This offsetting impedance is proportional and in opposition to the known impedance of the twisted pair link 16. The offsetting impedance thereby negates the effect of the known impedance of the twisted pair 16 on the broadband signal that passes over the twisted pair 16. The video receiver 20 is coupled to receive the broadband signal from the correcting amplifier circuit 32 through the demodulating circuit 26 to extract a video signal therefrom.

As illustrated in FIGS. 1–4, the stations 12 and 14 of the telecommunication system 10 are comprised of not only circuitry for transmitting and receiving a video signal over a twisted pair link 16, but are each further comprised of additional signal sources for providing additional telecommunication signals. These signal sources are indicated diagrammatically as a telephone handset 34 and four data transmission sources, indicated diagrammatically as the data transmitting modules 36, 38, 40 and 42 of computer modems. Each of the stations 12 and 14 also is provided with telephone handset 34' and data receiving modules 36', 38', 40' and 42' which are respectively coupled to the telephone 34 and the data transmitting modules 36, 38, 40 and 42 of the other station through the multiplexing units 22.

The frequency modulating circuit 24 is coupled to receive the signals from the signal sources 18 and 34–42 and to modulate those signals. The broadband amplifier circuit 28 is coupled to the frequency modulating circuit 24 to receive the modulated signals therefrom and to pass the amplified signals to the line driver circuit 19. The demodulating circuit 26 is coupled to the symmetrical video transformer 30 and to the correcting amplifier 32 to receive the broadband signal of FIG. 3 therefrom. The demodulating circuit 26 demodulates the broadband signal to separately reproduce the video signal and transmit it to a video receiver 20 and to separately reproduce each of the additional signals and transmit them to corresponding communication receivers 34', 36', 38', 40' and 42'. The communication receiver 34' is a conventional telephone handset, while the receivers 34', 36', 38', 40' and 42' are all data receiving modules of computer data modems.

D.C. Power Supply

Figure 2:
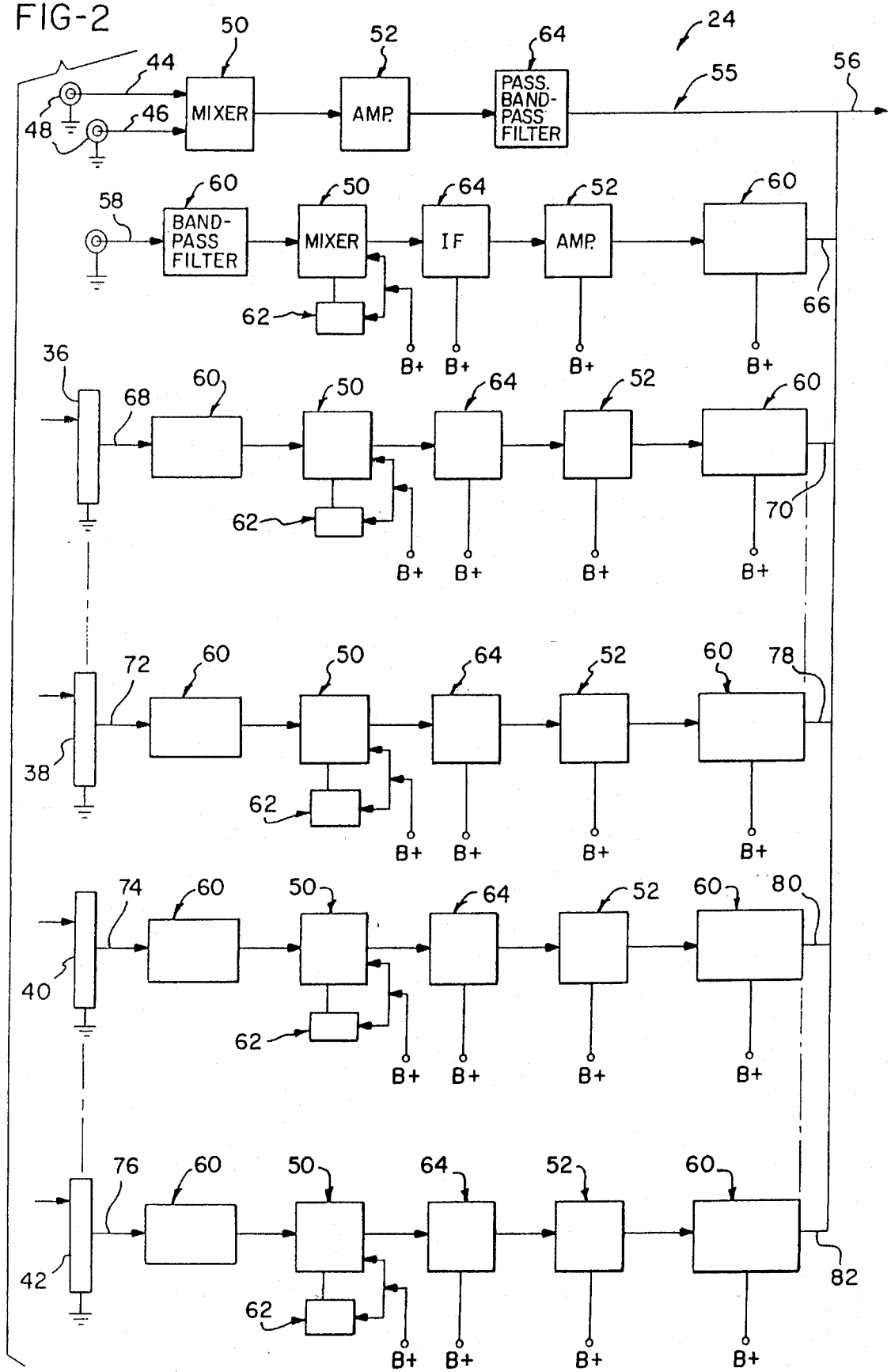
FIG. 2 is a block diagram of one of the transmitting terminals at one of the stations in the telecommunication system of FIG. 1.

The modulating circuit 24 of the stations 12 and 14 are identical to each other and are of the type depicted in block diagram form in FIG. 2. Power is supplied to both the modulating circuit 24 and the demodulating circuit 26 at each station by a common power supply which is illustrated schematically in FIG. 5. The direct current power supply is derived from either a 110 or 220 volt alternating current power source. The alternating current input is provided on either lines 162 and 164 or lines 162 and 166, depending upon whether the available alternating current power supply is 110 or 220 volts. The alternating current supply is provided as an input to power transformer 168, the secondary of which is connected to a rectifier circuit 170. The diodes D1–D4 of the rectifier circuit 170 are model IN4003 diodes. The rectified power output is provided to a model LP 2400, 24 volt direct current regulator. The power supply circuit also employs two 101 microfarad capacitors 174; two 1 microfarad capacitors 176; and two 2200 microfarad capacitors 178. A 2 microhenry inductor 180 provides the regulated direct current power supply to the modulating circuit 24 and the demodulating circuit 26 as the B+ voltage through a diode 182.

Multiplex System

The video signal generating source 18 of FIG. 1 produces a composite video signal 43 which has a video channel output 44 and an audio channel output 46 that appear on separate BNC connectors 48, as indicated in FIG. 2. The composite video signal 43 is from 0.7 to 1.77 volts, peak to peak with a 6 megahertz bandwidth and 75 ohms impedance.

The video component 44 and the audio component 46 of the video signal 43 are mixed together in a mixing circuit 50. The individual circuit modules of the modulating circuit 24 and the demodulating circuit 26 are illustrated in FIGS. 6–10. The mixing circuit 50 is depicted schematically in FIG. 6 and is used to mix the audio and video components 44 and 46 of the video signal into a composite signal of 6 megahertz bandwidth. The mixer circuit 50 transmits that signal to an amplifier circuit 52 which is illustrated schematically in FIG. 7. The amplified output from the amplifier 52 is directed to a bandpass filter 64 which is illustrated schematically in FIG. 8. The bandpass filter 64 passes an output of 0 to 8 megahertz bandwidth. This signal appears at 55 in FIGS. 2 and 3 and is coupled to line 56 which leads to the broadband amplifier 28 of FIG. 1, that is illustrated schematically in FIG. 11.

The telephone signal initiating device 34 is a conventional RJ11 full duplex telephone handset. The telephone signal from the handset 34 is passed as an additional signal input on line 58 to a 4 kilohertz bandpass filter 60 of the type illustrated schematically in FIG. 9. From the bandpass filter 60 the telephone signal is directed to a mixer circuit 50 of the same type employed to mix the audio and video components 44 and 46 of the video input signal 43. However, the mixer circuit 50 which receives the filtered telephone signal is used to modulate the telephone signal with a subcarrier frequency generated by an oscillator circuit 62, depicted schematically in FIG. 10. The subcarrier frequency generated by the oscillator circuit 62 for the telephone communication signal is a signal of 8.06 megahertz frequency. Both the mixer circuit 50 and the oscillator circuit 62 are powered by the B+ direct current voltage supply derived from the power supply circuit depicted schematically in FIG. 5.

Figure 8:
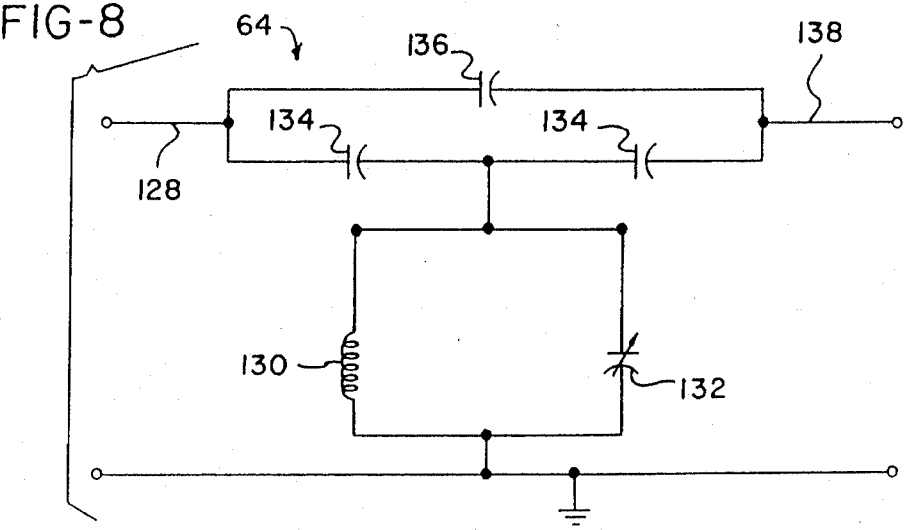
FIG. 8 is a schematic diagram of a bandpass filter circuit employed in both the transmitting terminal of FIG. 2 and the receiving terminal of FIG. 4.

The output of the mixer 50 that amplifies the telephone input signal from the telephone handset 34 is directed to a bandpass filter circuit 64 of the type depicted schematically in FIG. 8. The output of the bandpass filter 64 is directed to another amplifier circuit 52 of the type depicted in FIG. 7. The amplifier circuit 52 which is used to amplify the telephone signal has the same circuit configuration as the amplifier circuit 52 employed to amplify the video signal, but with components of different values so as to produce an amplified output in a different band range.

Figure 9:
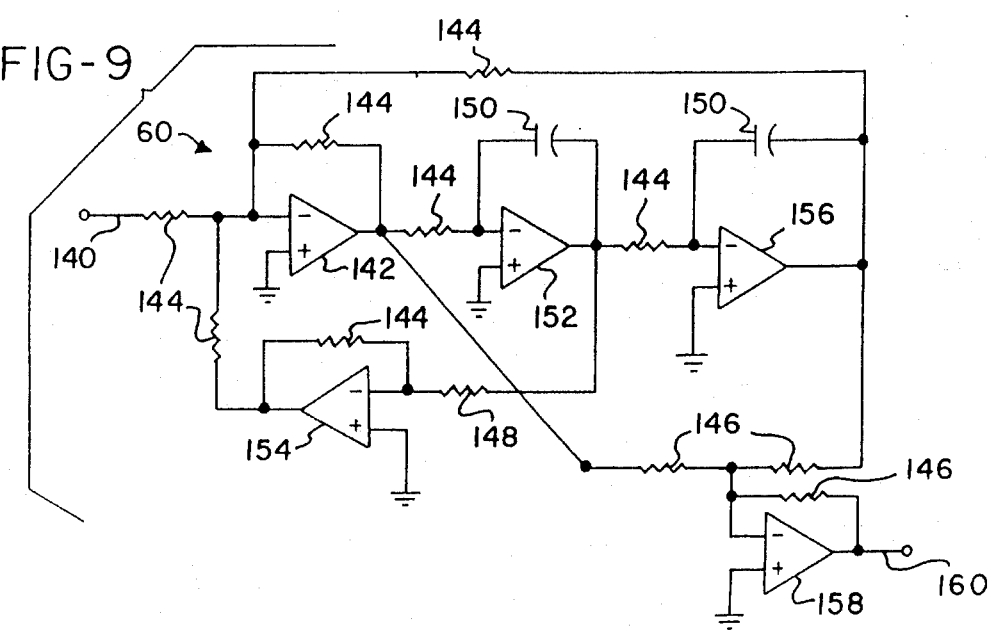
FIG. 9 is a schematic diagram of a notch filter circuit employed in both the transmitting terminal of FIG. 2 and the receiving terminal of FIG. 4.

The output from the amplifier circuit 52 which amplifies the telephone signal is directed to another bandpass filter 60 of the type depicted in FIG. 9. The filtered and amplified telephone signal that was first originated at the telephone handset 34 is passed as a modulated signal 66 lying in the frequency range between 8.0 and 8.10 megahertz. The modulated telephone signal 66 is combined with the filtered and amplified video signal 55 and passes on line 56 to the broadband amplifier circuit 28, depicted schematically in FIG. 11.

A further additional signal initiating means may be the transmitting portion 36 of an RS 232 full duplex serial input data modem. The input portion 36 of the RS 232 modem produces a data signal 68 having a 4 kilohertz bandwidth. The additional data signal 68 is transmitted to a bandpass filter circuit 60 of the type depicted in FIG. 9 to eliminate ambient 60 cycle harmonics and other noise. The filtered data signal is then transmitted to a mixer circuit 50 of the type depicted in FIG. 6, where it is mixed with a subcarrier frequency of 8.26 megahertz by an oscillator circuit 62 of the type depicted in FIG. 10. The modulated data signal is then passed to a broadband filter circuit 64 of the type depicted in FIG. 8, and then to an amplifier circuit 52 of the type depicted in FIG. 7. The amplified data signal is then passed to a notch filter circuit 60 of the type depicted in FIG. 9. The filtered and amplified data signal 70 lies in a frequency band between 8.2 and 8. megahertz.

The other additional data signals are likewise generated by the transmitting portions of RS 232 full duplex data modems, indicated at 38, 40 and 42. These transmitting modem portions generate additional data signals indicated respectively at 72, 74 and 76. These data signals 72, 74 and 76 are processed precisely in the same manner as the data signal 68, with the exception that the subcarrier frequency generated by the oscillator circuit 62 for each data signal is different. The filtered and amplified data signal 78 lies in a frequency band between 8.6 and 8.7 megahertz. The filtered and amplified data signal 80 lies in a frequency band between about 8.9 and 9 megahertz, while the modulated data signal 82 lies in a frequency band of between about 9 and 10 megahertz.

When the modulated signals 55, 66, 70, 78, 80 and 82 leave the modulating circuit 24, they lie within a broad 10 megahertz bandwidth, as indicated in FIG. 3. The composite signal on line 56 is then passed to the broadband amplification circuit 28 of FIG. 11.

Mixture Circuit

FIG. 6 schematically illustrates the mixer circuit 50. The mixer circuit 50 is employed in the processing of the video signal 43 to mix the audio and video signal components 44 and 46. In the processing of the video signal 43 the audio component 44 is passed as a shielded input on line 84 to the coil 86 of a transformer circuit. The video input 46 is passed as a shielded input on line 88 to the center of a transformer coil 90. The transformer coil 90 is coupled to a rectifier circuit 92, the output of which is connected to a transformer coil 94, the center of which is grounded. The composite mixed output of audio and video appears on the transformer coil 96 and is passed as an output signal on line 98.

The same mixing circuit 50 is employed to mix the telephone and data signals with the subcarrier frequency generated by the oscillator circuit 62 of FIG. 10. In the processing of the telephone and data signals the voice or data signal is provided as a shielded input on line 84 while the carrier frequency from the oscillator circuit 62 is provided as a shielded input on line 88. The data signal, modulated by the carrier frequency from the oscillator circuit 62 appears as an output on line 98.

Amplifier

The modulating circuit 24 also employs a separate amplifier circuit 52 for each of the video, telephone and data signals. The input to the amplifier circuit 52 appears on line 112 and is passed through a capacitor 114. In the circuitry for amplifying the video signal the capacitor 114 is a 0.1 microfarad capacitor, while in the circuitry for amplifying the voice and data signals the value of the capacitor 114 is 0.22 microfarads. B+ voltage is provided on line 116 from the power supply circuit of FIG. 5. The amplifier circuit 52 also includes a 56K ohm resistor 118, a 15K ohm resistor 120 and a 68K ohm resistor 122. An NPN transistor 124 provides an amplified common emitter output on line 126.

Oscillator

The oscillator circuit 62 is depicted in detail in FIG. 10. The oscillator circuit 62 employs a model 2N489 field effect transistor 100, a 16 picofarad capacitor 102, and resistors 104, 106 and 108 having values of 470 ohms, 27K ohms and 330 ohms, respectively. The oscillator output appears on line 110, which is connected to the input line 88 of the double balanced mixer circuit 50 of FIG. 6 for each of the telephone and voice signal modulating circuit paths.

Bandpass Filter

Each modulating circuit 24 also includes a passive bandpass filter 64 for each of the video, telephone and date signals. The bandpass filter circuit 64 is illustrated schematically in FIG. 8. The input appears on line 128. The broadband filter circuit 64 includes a tank circuit having an inductor 130 and a variable capacitor 132 connected in parallel from ground to the signal path. The inductor 130 has a value of 27 microhenrys while the capacitor 132 varies between 0 and 80 picofarads. The tank circuit output is coupled between two capacitors 134 of 22 picofarads each, which together are coupled in parallel with a 47 picofarad capacitor 136 between the signal input on line 128 and the filtered signal output on line 138.

The output line 138 from the bandpass filter circuit 64 in the video signal modulating circuit carries the amplified and filtered video signal 43 from the video camera 18 as the mixed and amplified video signal 55. The bandpass filter circuit 64 may be tuned to provide a frequency output 6 megahertz in bandwidth for those video systems where video channels are allocated a 6 megahertz bandwidth. Alternatively, the bandpass filter 64 may be tuned to provide an output of 7.5 megahertz bandwidth for those carrier systems in which video channels are allocated a 7.5 megahertz bandwidth output. The bandpass filters 64 employed in filtering the telephone and data signals, on the other hand, are tuned to provide an output having a bandwidth of between 1 and 2 megahertz for each telephone signal 58 and each data signal 68, 70, 72, 74 and 76.

Notch Filter

Each modulating circuit 24 also filters each of the narrow frequency band telephone and data signals from the handset 34 and from the data modem transmitter section 36–42 through notch filter circuits 60 of the type depicted in detail in FIG. 9. The input signal to each notch filter circuit 60 appears on line 140 as the negative input to an operational amplifier 142. The notch filter circuit 60 also includes resistors 144, each having a value of 3.3K ohms, resistors 146, each having a value of 10K ohms, a resistor 148 having a value of 68K ohms, and capacitors 150 of 0.33 microfarads each. The output of operational amplifier 142 is directed as the negative input to another operational amplifier 152, which is coupled in a loop to operational amplifier 154. The output of operational amplifier 152 is also connected to the negative input of operational amplifier 156. The output of operational amplifier 142 is connected also to the negative input of an operational amplifier 158. The operational amplifiers 142, 144, 152, 156 and 158 are all IC components, model MC4301. The filtered output of the notch filter circuit 60 appears on line 160.

The wave form of the composite multiplexed broadband signal output produced by each modulating circuit 24 is depicted diagrammatically in FIG. 3. The video signal indicated at 55 may be either 6 megahertz or 7.5 megahertz in bandwidth. The telephone signal 66 lies in a bandwidth between 8 and 8.10 megahertz. The data signal 70 lies in the bandwidth between 8.2 and 8.4 megahertz. Data signal 78 lies in the 8.6 to 8.7 megahertz band, while data signal 80 has a bandwidth between 8.9 and 9 megahertz. Data signal 82 lies in a bandwidth between 9 and 10 megahertz.

Broadband Amplifier

The broadband amplification circuit 28 depicted in FIG. 11 is interposed between the camera 18 that provides the video signal 43 and the first end 15 of the twisted pair of telephone wires 16 to amplify the multiplexed video signal 43, as well as the multiplexed telephone and data signals. The broadband amplification circuit 28 receives the amplified and modulated video, telephone and data signals from their respective sources and produces an amplified broadband signal output.

The broadband amplifier circuit 28 includes a tank circuit having a 245 microhenry inductor 190 and a variable capacitor 192 that can be varied between 0 and 80 picofarads. The output of the tank circuit is connected between a pair of capacitors 134 which are coupled in parallel with capacitor 136. The tank circuit and the capacitors 134 and 136 filter the input signal on line 56 to amplify only the desired 10 megahertz bandwidth and filter out ambient RP signals that are likely to be present in an environment of computers and video processing equipment.

The isolated 10 megahertz band output is passed to a capacitor 194 which serves as the input to a two stage amplifier. A model BC548 NPN transistor 196 provides the first stage of amplification. The emitter of transistor 196 is connected to a 15K ohm resistor 198 and to a 150 ohm resistor 200 at the base of a model BC324 PNP transistor 202 which serves to correct for impedances. The collector of transistor 202 is connected to a 1.5K ohm resistor 204 and the emitter receives B+ voltage through a 1K ohm resistor 206.

The second stage of amplification is formed by transistors 208 and 210 which are coupled together. Both of the transistors 208 and 210 are model BC548 NPN transistors. Two transistors are employed in parallel to handle the amount of current that is developed. The emitters of the transistors 208 and 210 are coupled to ground through resistors 212 and 204, respectively. Resistor 212 has a value of 3.9K ohms. The output of the second amplification stage is directed through a 75 ohm resistor 214 and appears as an output on line 216. The broadband amplifier circuit 28 ensures that all portions of the spectrum of the input frequency on line 56 are linearly amplified in the output signal 216. The signal amplitude of output signal 216 is thereby uniform.

Line Driver

Figure 12A:
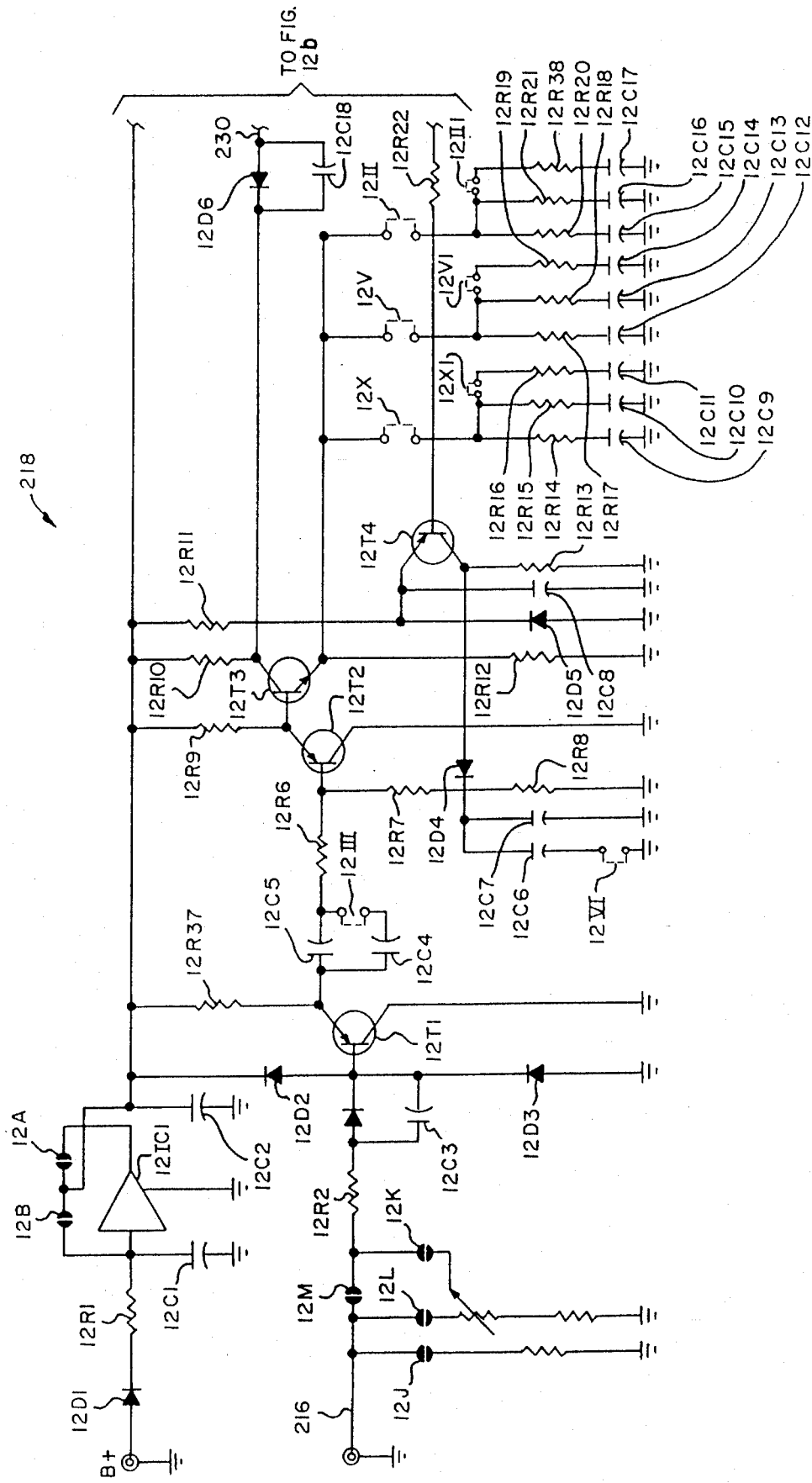
FIGS. 12a and 12b are schematic diagrams of the line driver circuit employed in the transmitting terminals of the telecommunication system of FIG. 1.
Figure 12B:
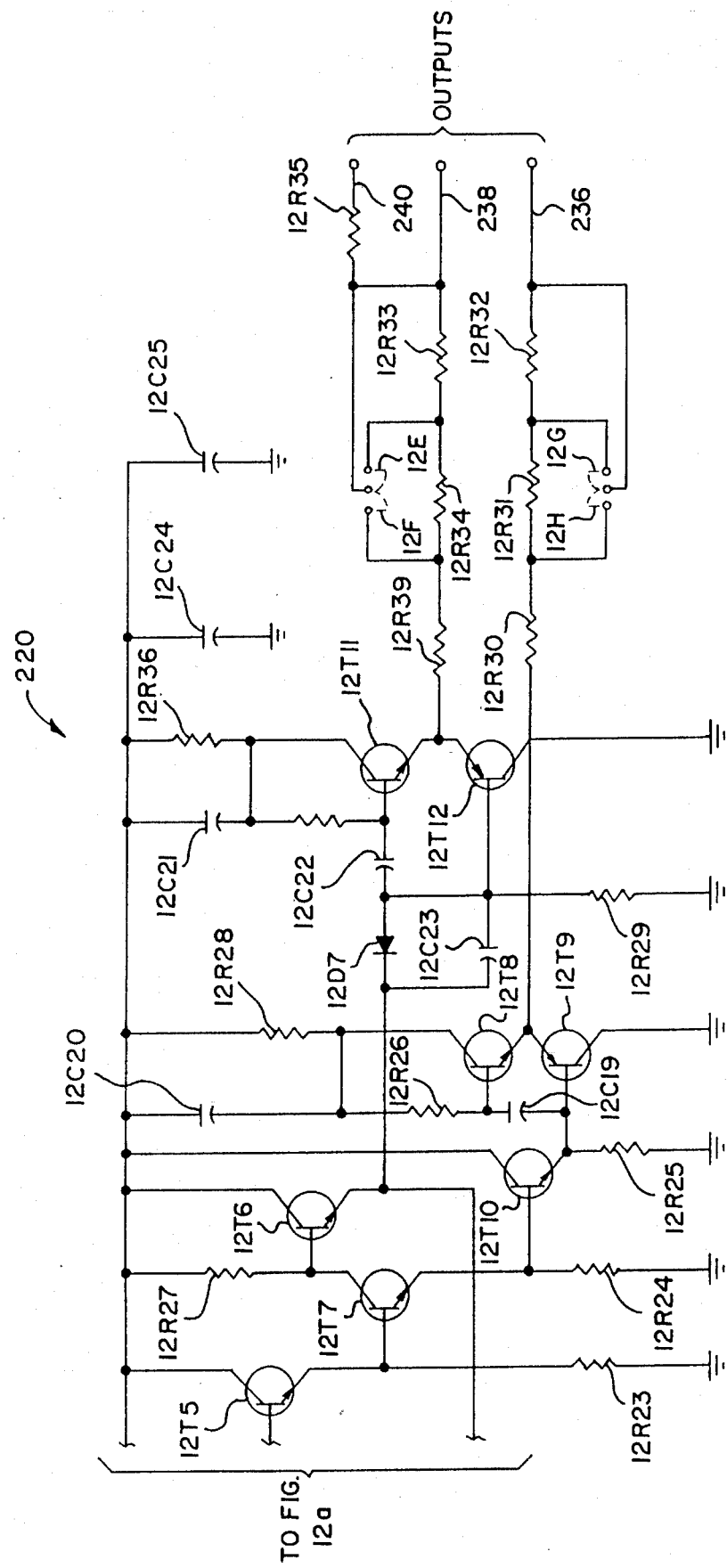

The output 216 of broadband amplifier circuit 28 is provided as an input to circuit portions 218 and 220 which together form the line driver circuit 19 and are depicted schematically in FIGS. 12a and 12b, respectively. The signal input line 216 to the line driver circuit 19 appears in FIG. 12a. The line driver circuitry of FIGS. 12a and 12b is comprised of a gain selection means including a transmit signal emitter follower amplification circuit and resistor-capacitor combinations which are selectively and alternatively strapped into the transmit signal emitter follower amplification circuit as determined by the length of the twisted pair link 16. The values of the resistors and capacitors are set forth in Table 1. The amplifier, diode and transistor model designations are also set forth in Table 1.

TABLE 1

| Component | Value/Designation |
| --- | --- |
| 12IC1 | = 78M15CFAI |
| 12D1 | = IN 4003 |
| 12D2, 12D3, 12D4 | = IN 4148 |
| 12D5 | = BZX97A9V1 |
| 12D6 | = BZX83C2V7 |
| 12D7 | = BZX83C5V5 |
| 12D8 | = BZX83C6V8 |
| 12C1, 12C5 | = 0.22 microfarad, 100 volts |
| 12C2 | = 10 microfarads, 35 volts |
| 12C3 | = 2.2 microfarads, 16 volts |
| 12C4 | = 22 microfarads, 15 volts |
| 12C6 | = 0.1 microfarad, 63 volts |
| 12C7 | = 1000 picofarads, 63 volts |
| 12C8 | = 22 microfarads, 16 volts |
| 12C9 | = 100 picofarads |
| 12C10 | = 68 picofarads |
| 12C11 | = 220 picofarads |
| 12C12 | = 150 picofarads |
| 12C13 | = 56 picofarads |
| 12C14 | = 270 picofarads |
| 12C15 | = 300 picofarads |
| 12C16 | = 82 picofarads |
| 12C17 | = 330 picofarads |
| 12C18 | = 2.2 microfarads, 16 volts |
| 12C19, 12C22 | = 10 microfarads 3 volts |
| 12C20, 12C21 | = 22 microfarads, 16 volts |
| 12C23 | = 47 microfarads, 63 volts |
| 12C24, 12C25 | = 10 microfarads, 35 volts |
| 12T1, 12T2 | = BC558B |
| 12T3, 12T7 | = BF311 |
| 12T4 | = BC558C |
| 12T5, 12T6, 12T10 | = BC548B |
| 12T8, 12T9, 12T11 | = BC338.40SIE |
| 12T12 | = BC328.40SIE |
| 12R1 | = 15 ohms |
| 12R2, 12R5 | = 82 ohms |
| 12R3 | = 100± ohms |
| 12R4 | = 130 ohms |
| 12R6 | = 22 ohms |
| 12R7 | = 22K ohms |
| 12R8 | = 100K ohms |
| 12R9, 12R13 | = 10K ohms |
| 12R10 | = 1.69K ± 1% ohms |
| 12R11, 12R18, 12R19 | = 1.5K ohms |
| 12R12 | = 560 ohms |
| 12R14 | = 56 ohms |
| 12R15 | = 2K ohms |
| 12R16, 12R23 | = 2.2K ohms |
| 12R17 | = 100 ohms |
| 12R20 | = 150 ohms |
| 12R21 | = 5.6K ohms |
| 12R22 | = 2.7K ohms |
| 12R24, 12R27 | = 681 ± 1% ohms |
| 12R25, 12R29 | = 820 ohms |
| 12R26 | = 180K ohms |
| 12R28, 12R36 | = 680 ohms |
| 12R30, 12R31, 12R34 | = 18 ± 2% ohms |
| 12R32, 12R33 | = 24 ± 2% ohms |
| 12R35 | = 18 ohms |
| 12R37 | = 2.2K ohms |
| 12R38 | = 1.5K ohms |
| 12R39 | = 18 ohms |

As illustrated in FIGS. 12a and 12b there are a number of bridges provided initially in a normally open condition. These bridges are indicated at 12A, 12B, 12J, 12K, 12L, 12M and at 12X, 12V, 12II, 12III, 12VI, 12X1, 12V1 and 12III1. Contacts 12A, 12B, 12J, 12K, 12L, and 12M are selectively strapped by soldering, while contacts 12II, 12III, 12V, 12X, 12XI, 12V1, 12VI, 12III1, 12E, 12F, 12G and 12H are plug-in bridges.

The selective strapping of the bridges determines which resistor-capacitor combinations are brought into the line driver circuit 19. To illustrate, the resistors 12R14 through 12R21 and 12R38 and the capacitors 12C9 through 12C16 may be selected in alternative combinations as determined by the plug-in bridge contacts 12X, 12V, 12II, 12X1, 12V1 and 12II1 to change the gain of the amplifier 12T3. The appropriate gain of amplifier 12T3 is dependent upon the length and impedance of the twisted pair link 16.

By selecting the appropriate resistor-capacitor combination, saturation of the transistor 12T3 is prevented, depending upon the frequency band to be transmitted. That is, the circuit configuration depicted in FIGS. 12a and 12b is suitable for transmitting a bandwidth of from 6 to 10 megahertz as received from the output line 216 of the broadband amplifier circuit 28. Appropriate selection of the resistor-capacitor combinations is made depending upon the bandwidth, as well as upon the impedance of the twisted pair link 16. The output of transistor 12T3 on line 230 is uniformly amplified over the frequency band selected and is provided to the amplification stages of transistors 12T5–12T12 in FIG. 12b.

Appendix A hereto sets forth exemplary soldered and plug-in contact connections which are strapped into the circuit as appropriate for different lengths and different gauges of wire for the twisted pair link 16, as indicated. The conditions of the contacts for other lengths and gauges of twisted pair links is ascertained empirically.

From the line driver circuitry of FIGS. 12a and 12b the amplifier outputs are connected to the first end 15 of the twisted pair of telephone wires 16. The telephone wires employed in the twisted pair links 16 are conventional insulated copper wires of 16, 22, 24 or 26 gauge which are used throughout the national telephone network for supplying telephone service to subscriber locations from telephone company central offices. The twisted pair links 16 must be unloaded and may be of a length dependent upon the gauge of the wire employed. For example, a twisted pair link 16 with polyethylene insulation may be up to 11,055 feet in length if 19 gauge wire is employed. A twisted pair link 16 with polyethylene insulation may be up to 9,570 feet in length if 20 gauge wire is employed; up to 7,755 feet in length if 22 gauge wire is employed; and up to 5,775 feet in length if 26 gauge wire is employed. Twisted pair links of even greater lengths may be utilized by maximizing the efficiency of the components employed in the system.

Symmetrical Video Transformer

Figure 13A:
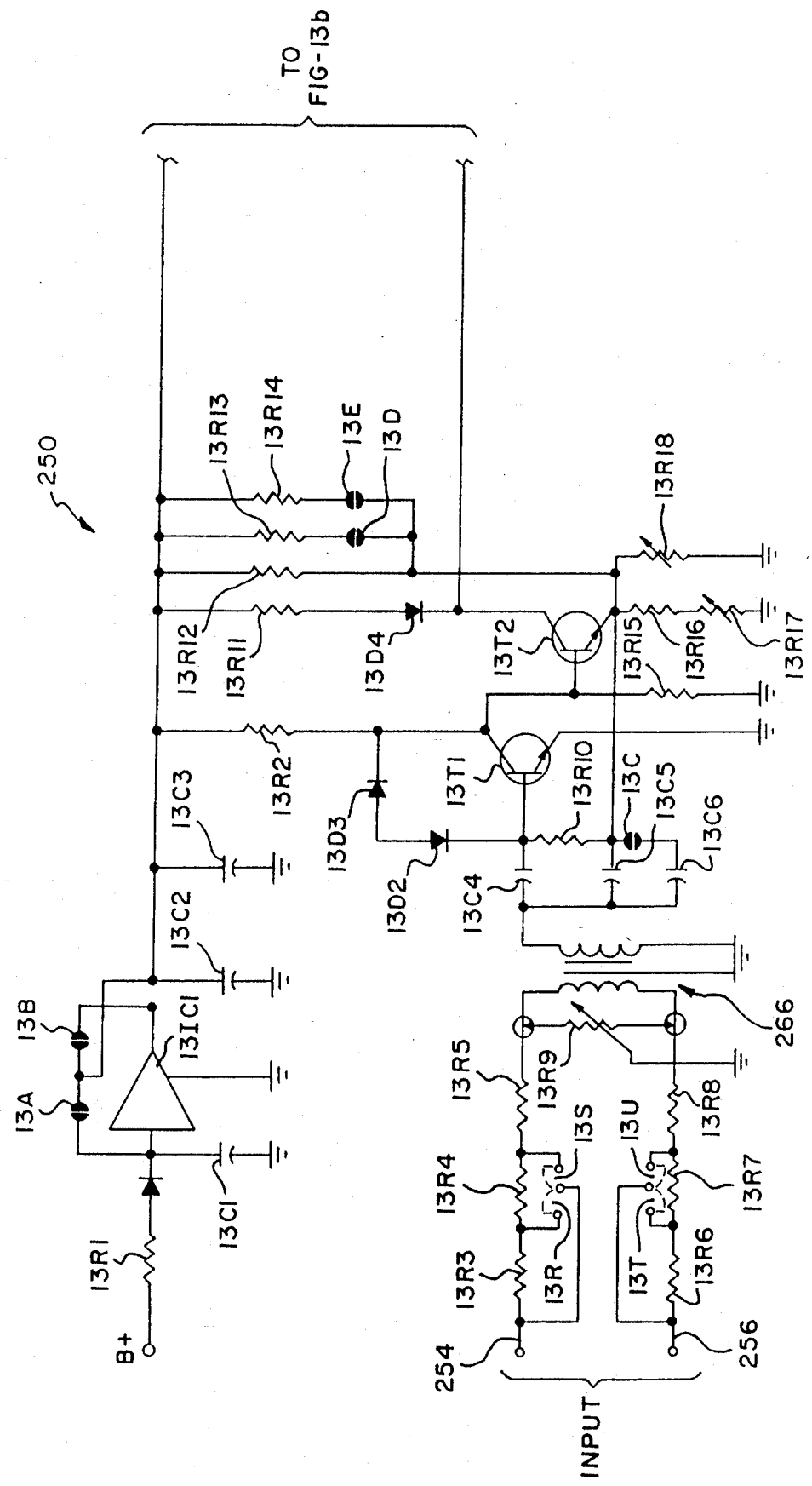
FIGS. 13a and 13b are schematic diagrams of the symmetrical video transformer circuit employed in the receiving terminals of the telecommunication system of FIG. 1.
Figure 13B:
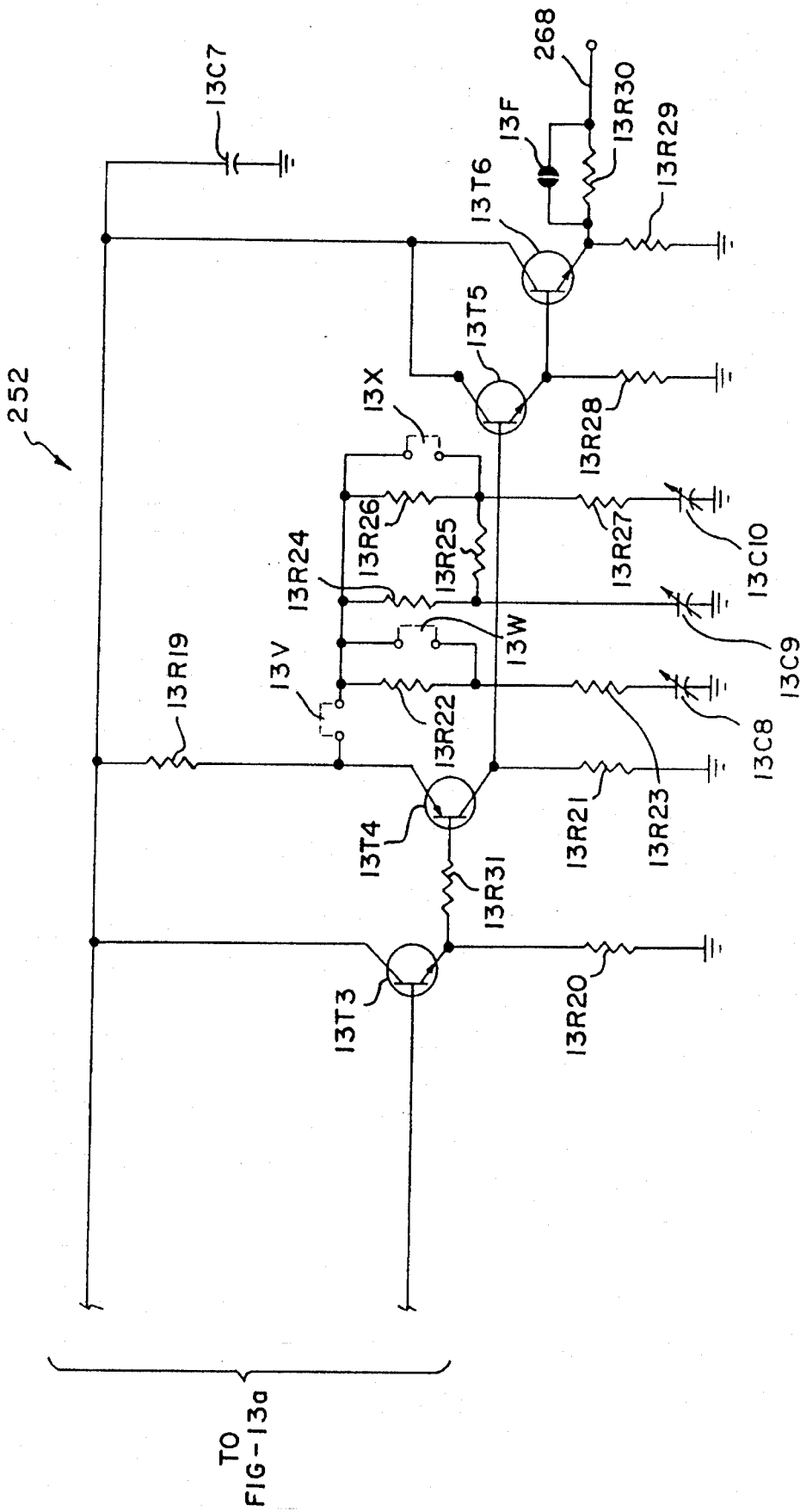

At the second end 17 of each twisted pair link 16 the signal, including the video signal originally provided at 43, appears as an input to the symmetrical video transformer circuit 30 having circuit portions depicted at 250 in FIG. 13a and at 252 in FIG. 13b. The input to the symmetrical video transformer circuit portion 250 in FIG. 13a is provided on lines 254 and 256 from the second end 17 of the twisted pair of telephone wires 16. The broadband signal on lines 254 and 256 is significantly degraded, but is reconstructed beginning with the symmetrical video transformer video portions 250 and 252 of FIGS. 13a and 13b.

The symmetrical video transformer circuit portions 250 and 252 include circuit components as listed in Table 2. The values of the resistor and capacitor components are listed in Table 2, as are the part or model designations of the diodes, transistors and the operational amplifiers required.

TABLE 2

| Component | Value/Designation |
|---|---|
| 13IC1 | = 78M15CFAI |
| 13D1 | = IN 4003 |
| 13D2, 13D4 | = IN 4148 |
| 13D | = BZX83C3V3 |
| 13C1 | = 0.22 microfarads, 100 volts |
| 13C2, 13C3, 13C7 | = 10 microfarads, 35 volts |
| 13C4 | = 220 microfarads, 3 volts |
| 13C5 | = 47 farads, 3 volts |
| 13C6 | = 22 farads, 3 volts |
| 13C8, 13C9, 13C10 | = Variable 25 to 500 picofarads |
| 13T1 | = BC33840SIE |
| 13T2, 13T5, 13T6 | = BC548B |
| 13T3 | = BF311 |
| 13T | = BF324SIE |
| 13R1 | = 22 ohms, 15 volts |
| 13R2, 13R20 | = 15K ohms |
| 13R3, 13R6 | = 24 + 2% ohms |
| 13R4, 13R7 | = 18 + 2% ohms |
| 13R5, 13R8 | = 20 + 2% ohms |
| 13R9, 13R23 | = 22 ohms |
| 13R10 | = 120K ohms |
| 13R11, 13R21, 13R29 | = 1.5K ohms |
| 13R12 | = 27K ohms |
| 13R13 | = 68K ohms |
| 13R14, 13R15 | = 33K ohms |
| 13R16 | = 390 ohms |
| 13R17 | = 15 NTC ohms |
| 13R18 | = 10 NTC ohms |
| 13R19 | = 1K ohms |
| 13R22 | = 47 ohms |
| 13R24 | = 1.3K ohms |
| 13R25 | = 10K ohms |
| 13R26 | = 3.3K ohms |
| 13R27 | = 2.7K ohms |
| 13R28 | = 3.9K ohms |
| 13R30 | = 75 ohms |
| 13R31 | = 150 ohms |

The Symmetrical video transformer circuit portion 250 of FIG. 13a includes resistor-capacitor combinations which are selected for connection into the symmetrical video transformer circuit 30 according to the impedance of the twisted pair link 16. This impedance, in turn, is governed by the length of the twisted pair of telephone wires forming the link 16, as well as by the gauge of the wires.

The symmetrical video transformer circuitry 30 includes contacts 13A, 13B, 13C, 13D, 13E, and 13F which are normally open, but which can be bridged by soldered connections as required. Other resistor-capacitor combinations may be connected in circuit by plug-in bridges and are indicated at 13R, 13S, 13T, 13U, 13V, 13W and 13X. Appendix A hereto sets forth the different resistor-capacitor combinations which are selectively and alternatively strapped into the symmetrical video transformer circuitry, as determined for specific lengths and gauges of the twisted pair link 16. The appropriate resistor-capacitor combinations for other length and gauges of twisted pair links 16 can be determined empirically.

The signal leaves the second or receiving end 17 of the twisted pair link 16 and appears on lines 254 and 256 in the symmetrical video transformer circuit portion 250 of FIG. 13a. An impedance matching transformer 266, part number G5603 is matched to the impedance of the twisted pair link 16 and amplifies all of the information received on lines 254 and 256, including the data signals, the telephone signals, the audio component of the video signal and the degraded video component of the video signal. The impedance matching transformer 266 amplifies all of this information with a uniform gain. The transistors 13T3, 13T4, 13T5 and 13T6 of FIG. 13b further amplify the received signal to build up the signal level for correction.

Correcting Amplifier

Figure 14A:
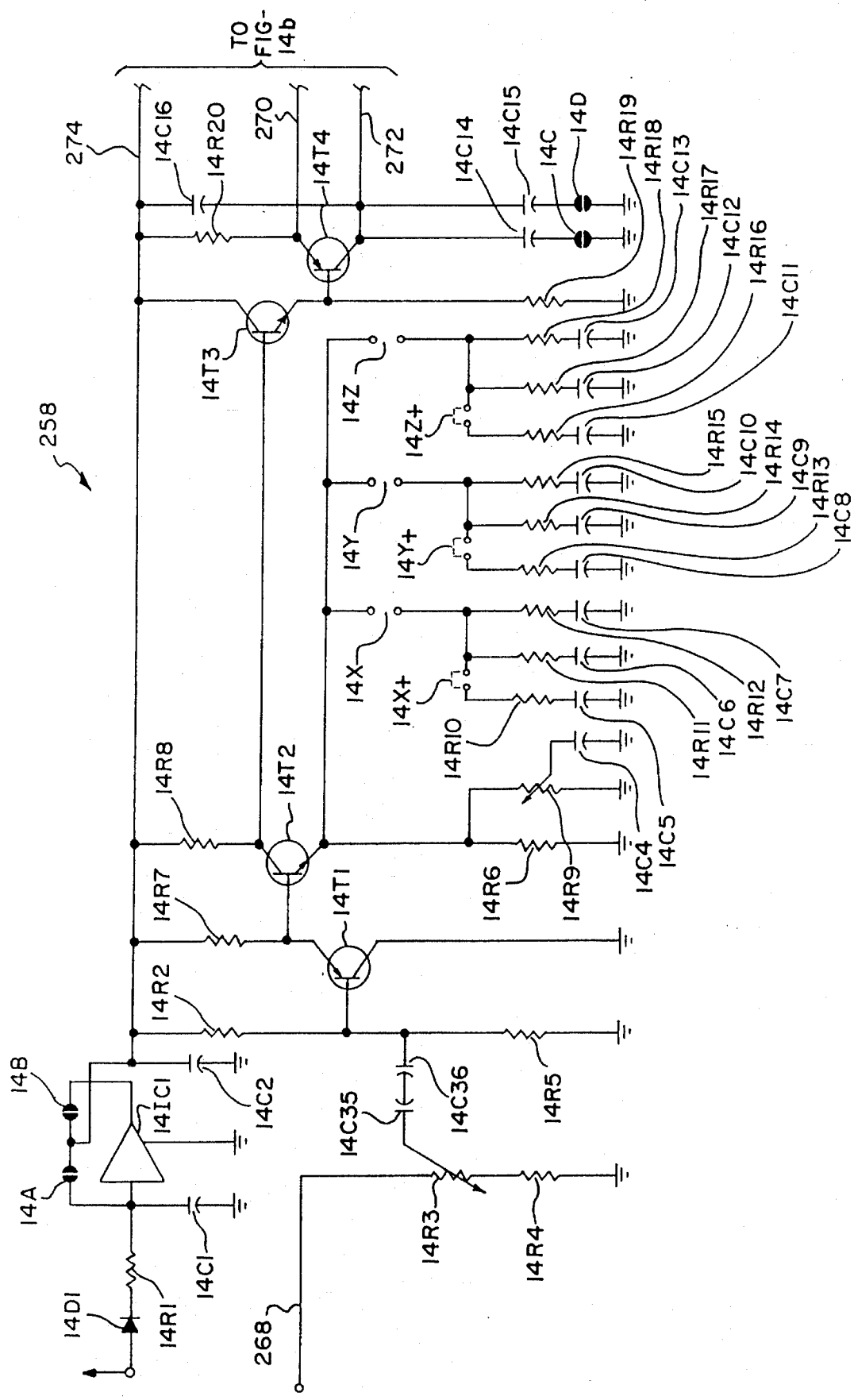
FIGS. 14a and 14b are schematic diagrams of the correcting amplifier circuit employed in the receiving terminals of the telecommunication system of FIG. 1.
Figure 14B:
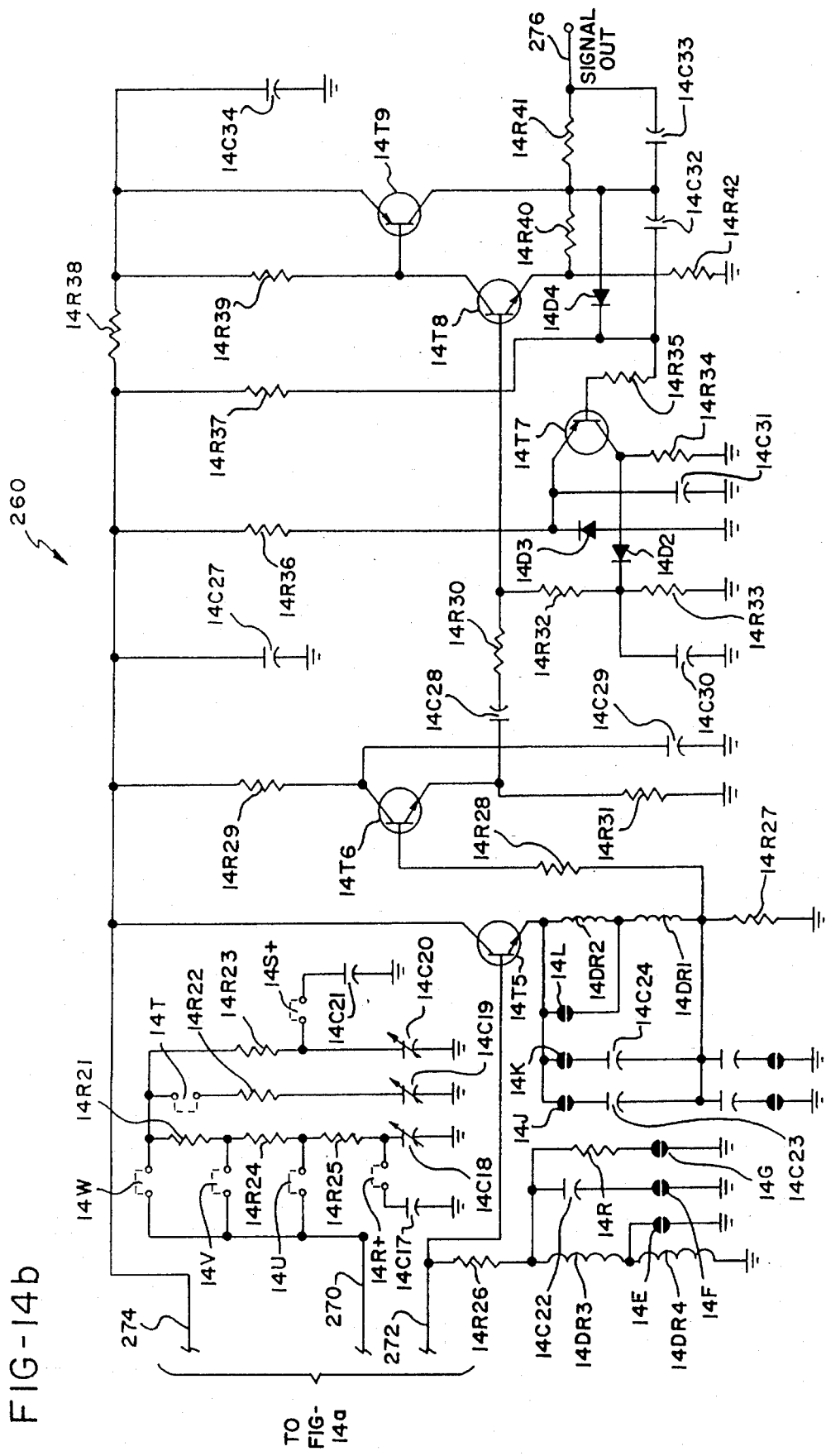

The correcting amplifier circuit 32 includes amplifying portions 258 and 260, which are respectively set forth schematically in FIGS. 14a and 14b. The correcting amplifier circuit 32 compensates for the impedance of the twisted pair link 16. The correcting amplifier circuit portion 258 is coupled to receive the amplified output from the impedance matching transformer 266 of the symmetrical video transformer circuit 30. The correcting amplifier circuitry portions 258 and 260 provide an offsetting impedance to the broadband signal transmitted thereto from the symmetrical video transformer circuit portion 260. This offsetting or compensating impedance is proportional and in opposition to the known impedance of the twisted pair link 16 to thereby negate the effects of the known impedance on the broadband signal. Table 3 lists the correcting amplifier components showing amplifiers and transistors by model number and the values of resistors and capacitors.

TABLE 3

| Component | Value/Designation |
| --- | --- |
| 14IC1 | = 78M15CFAI |
| 14T1 | = BC32840SIE |
| 14T2 | = BF311 |
| 14T3, 14T5, 14T6 | = BC548BVAL |
| 14T4 | = BF324SIE |
| 14T7 | = BC558C |
| 14T8 | = BC548C |
| 14T9 | = BC558BSIE |
| 14D1 | = IN4003 |
| 14D2 | = IN4148 |
| 14D3 | = BZX55A11 |
| 14D | = BZX55A9VI |
| 14C1 | = .22 microfarads, 100 volts |
| 14C2 | = 10 microfarads, 35 volts |
| 14C4 | = 330 picofarads |
| 14C5 | = 180 picofarads |
| 14C6 | = 82 picofarads |
| 14C7 | = 120 picofarads |
| 14C8, C21 | = 270 picofarads |
| 14C9 | = 56 picofarads |
| 14C10 | = 220 picofarads |
| 14C11 | = 470 picofarads |
| 14C12 | = 560 picofarads |
| 14C13 | = 390 picofarads |
| 14C14 | = 47 picofarads |
| 14C15 | = 22 picofarads |
| 14C16 | = 5.6 picofarads |
| 14C17, 14C22 | = 100 picofarads |
| 14C18, 14C19, 14C20 | = Variable 15 to 230 picofarads |
| 14C23, 14C24, 14C25 | = 18 picofarads |
| 14C26 | = 33 picofarads |
| 14C27, C34 | = 10 microfarads, 35 volts |
| 14C28 | = .15 microfarads |
| 14C29 | = .1 microfarads |
| 14C30 | = 2200 picofarads, 63 volts |
| 14C31, 14C32 | = 22 microfarads, 16 volts |
| 14C33 | = 120 picofarads, 63 volts |
| 14C35, 14C36 | = 47 microfarads, 6.3 volts |
| 14R1 | = 15 ohms |
| 14R2 | = 56K ohms |
| 14R3 | = 470 10%± ohms |
| 14R4, R29 | = 180 ohms |
| 14R5 | = 15K ohms |
| 14R6, 14R16, 14R39 | = 1K ohms |
| 14R7 | = 68K ohms |
| 14R8 | = 1.6K ohms |
| 14R9 | = 47K ohms |
| 14R10 | = 3K ohms |
| 14R11, 14R20 | = 1.8K ohms |
| 14R12 | = 56 ohms |
| 14R13, 14R27 | = 2.2K ohms |
| 14R14, 14R37 | = 3.9K ohms |
| 14R15, 14R28 | = 33 ohms |
| 14R17, 14R34 | = 10K ohms |

TABLE 3-continued

| Component | Value/Designation |
| --- | --- |
| 14R18, 14R25 | = 47 ohms |
| 14R19, 14R30, 14R32 | = 22K ohms |
| 14R21 | = 100 ohms |
| 14R22 | = 2.7K ohms |
| 14R23 | = 6.8K ohms |
| 14R24, 14R41 | = 68 ohms |
| 14R26 | = 1.2K ohms |
| 14R31 | = 470 ohms |
| 14R33 | = 220K ohms |
| 14R35 | = 3.3K ohms |
| 14R36 | = 4.7K ohms |
| 14R38 | = 47 ohms |
| 14R40 | = 1.3K ohms |
| 14R42 | = 680 ohms |
| 14R43 | = 330 ohms |
| 14DR1 | = 15 microhenrys |
| 14DR2 | = 15 microhenrys |
| 14DR3 | = 10 microhenrys |
| 14DR4 | = 33 microhenrys |

The correcting amplifier circuitry portions 258 and are comprised of an emitter-follower amplifier circuit and a plurality of combinations of resistors, capacitors and inductors. At least one of the combinations of resistors, capacitors and inductors is coupled in the emitter follower circuit, and other of the combinations are selectively isolated therefrom in accordance with the impedance of the twisted pair link 16. These resistor-capacitor-inductor combinations are selectively coupled in circuit and isolated by means of normally open bridges 14A, 14B, 14C, 14D, 14E, 14F, 14G, 14H, 14I, 14J, 14K and 14L which can be selectively closed by soldering, and by normally open plug-in bridges 14R+, 14S+, 14T, 14U, 14V, 14W, 14X, 14X+, 14Y, 14Y+, 14Z and 14Z+. The closures of these bridges for several selected lengths and gauges of different twisted pair of links 16 are set forth in Appendix A.

The amplified broadband video signal leaves the symmetrical video transformer circuit portion 252 on a signal output line 268. The signal output line 268 is connected as an input to the correcting amplifier circuit portion 258 in FIG. 14a. The bridging connections of FIG. 14a selectively connect resistors 14R10 through 14R18 and capacitors 14C5 through 14C15 into the amplifying circuitry of the correcting amplifier circuit portion 258 to partially compensate for the impedance of the twisted pair link 16. The correcting amplifier circuit portion 260 performs the phase adjustment necessary to complete the correction for the impedance of the twisted pair link 16.

The signal output lines 270, 272 and 274 from the correcting amplifier circuit portion 258 of FIG. 14a are connected as inputs to the correcting amplifier circuit portion 260 of FIG. 14b. The bridging contacts 14E, 14F, 14G, 14H, 14I, 14J, 14K, 14L, 14T, 14U, 14W and 14V are used to strap in the resistor-capacitor-inductor combinations that adjust the phase of the received broadband signal in order to reconstruct that signal.

The circuit portion 258 of the correcting amplifier circuit 32 serves as a trimming circuit and simulates a few turns of wire, so as to compensate for any minor mismatch between the impedance matching transformer 266 and the impedance of the twisted pair link 16. The correcting amplifier circuit portion 258 of FIG. 14a also functions as a received signal emitter follower amplification circuit. The resistor-capacitor combinations in the correcting amplifier circuit portion 258 are selectively and alternatively strapped into the received signal emitter follower amplification circuit as determined by the length of the twisted pair link 16. The correcting amplifier circuit portion 260 of FIG. 14*b* forms a phase adjustment means for applying a phase adjustment to the video signal. The circuit portion 260 employs resistor-capacitor-inductor combinations which are selectively and alternatively strapped into the phase adjustment amplifier circuit as determined by the length of the twisted pair of telephone wires 16.

Together the symmetrical video transformer circuit portions 250 and 252 and the correcting amplifier circuit portions 258 and 260 form a unity gain amplification means that is coupled to the second end 17 of the twisted pair link 16 to reproduce the video signal 55 with a compensating impedance impressed thereon that is proportional and opposite to the known impedance of the twisted pair link 16. The impedance impressed upon the signal by the correcting amplifier circuit portions 258 and 260 is equal to and cancels out the effects of the line impedance in the twisted pair link 16.

The final signal output line 276 from the correcting amplifier circuit portion 260 carries a broadband signal which is restored to the configuration of FIG. 3. The output signal on line 276 in the correcting amplifier circuit portion 260 is a fully reconstructed broadband signal, including all of the signal components of FIG. 3. The correcting amplifier circuitry reconstructs all of the signals, including the video signal 55. That signal is fully reconstructed and complete with horizontal sync pulses and color information in the video signal 55.

Demodulation

As the fully reconstructed composite broadband signal of FIG. 3 leaves the correcting amplifier circuitry on line 276 of FIG. 14*b*, it is passed to demodulating circuitry indicated generally at 26 in FIG. 1. The demodulating circuitry 26 forms a frequency division demodulating means that is coupled between the impedance compensating means of FIGS. 13*a*, 13*b*, 14*a* and 14*b* and the receivers for each of the signal components, indicated at 20, 34', 36', 38', 40' and 42' in FIG. 1 The demodulating circuitry 26 employs many of the same subcircuits of the modulating circuit 24.

Figure 4:
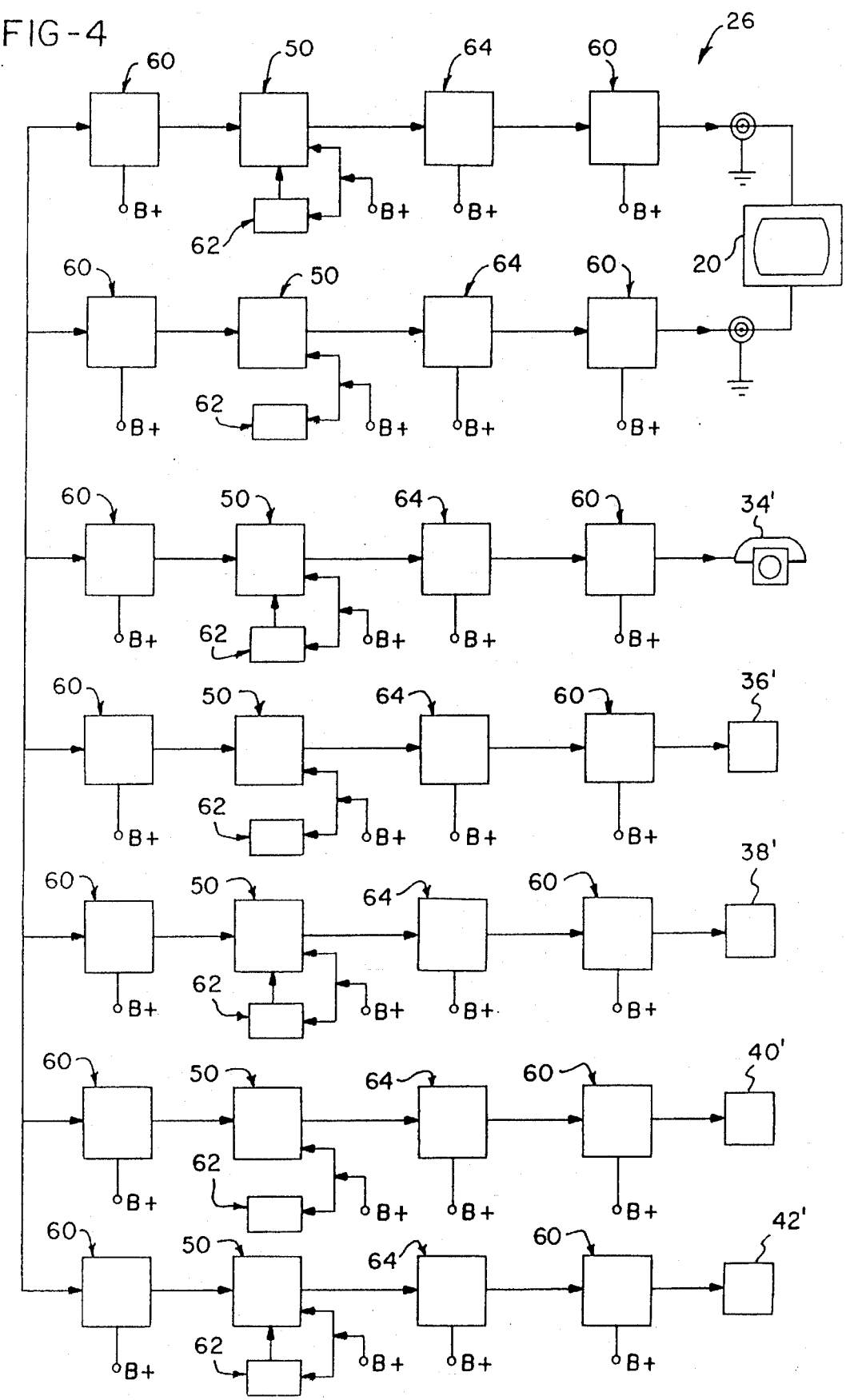
FIG. 4 is a block diagram of one of the receiving terminals at one of the stations in the telecommunication system of FIG. 1.
Figure 7:
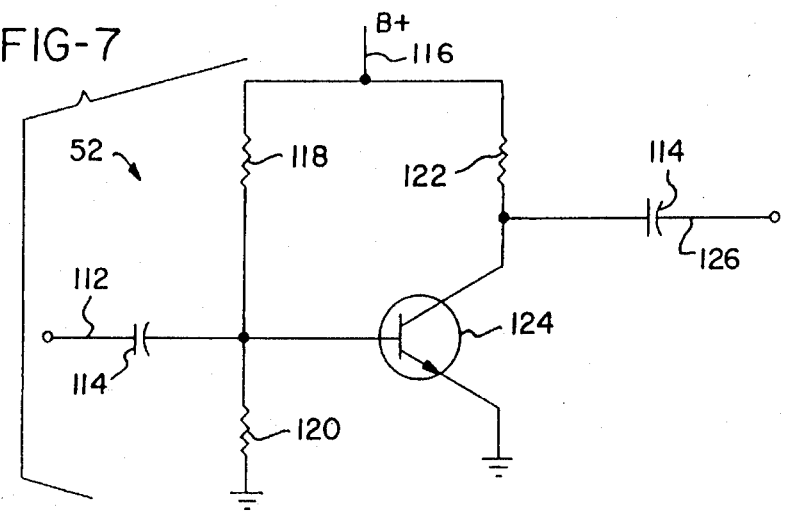
FIG. 7 is a schematic diagram of an amplifier oscillator circuit employed in both the transmitting terminal of FIG. 2 and the receiving terminal of FIG. 4.

The demodulating circuit 26 is depicted in block diagram form in FIG. 4. The demodulating circuit 26 removes the carrier frequency from each of the telephone and data channels and directs the signal component to an appropriate receiver. That is, as illustrated in FIG. 1, the reconstructed video signal 43', having reconstructed audio and video components 44', 46', is directed to a television receiver 20. The reconstructed telephone signal is directed to a telephone handset 34', which is identical to the telephone handset 34. Similarly, the data signal from the data modem transmitting module 36 is directed to a data modem receiving module 36'. The data signal from data modem transmitting module 38 is directed to a data modem receiving module 38'. The data signal from data modem transmitting module 40 is directed to a modem data receiving module 40'. The data signal from the data modem transmitting module 42 is directed to a data modem receiving module 42'.

The system of FIG. 1 illustrates two stations 12 and 14 which are connected directly to each other by a twisted pair link comprised of a single pair of telephone wires 16. It is to be understood, however, that the system is equally applicable to stations connected in a nationwide or worldwide telecommunication network.

Figure 15:
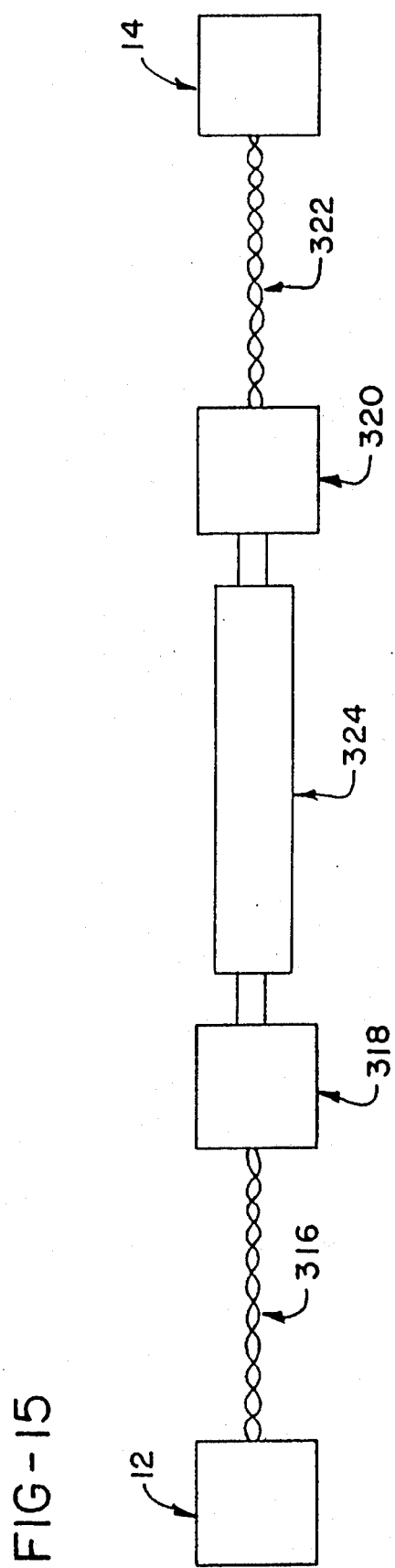
FIG. 15 is a block diagram of a variation of the telecommunication system of FIG. 1.

FIG. 15 illustrates such a system in which the station 12 is connected by an unloaded twisted pair of telephone wires 316 to a telephone central office 318. The central office 318 is connected into a nationwide common carrier telecommunication network including buried and overhead coaxial cable, fiberoptics, laser, microwave, satellite and infra-red telecommunications links, indicated generally at 324. The station 14 is likewise connected to a central office 320 by an unloaded twisted pair of telephone wires 322. The central office 320 is also connected into the same common carrier telecommunications network 324.

Thus, the invention may be applied to stations which are connected to each other by a mere six thousand feet of a twisted pair of telephone wires as illustrated in FIG. 1, or to stations located thousands of miles apart and connected to each other by a twisted pair link including component lengths of pairs of twisted telephone wire 316 and 322 through central offices 318 and 320 and a common carrier 324.

It is to be understood that the telecommunication system of the invention is not necessarily connected to either a local or nationwide telephone network. To the contrary, the stations 12 and 14, if located in physical proximity to each other, could be connected together directly by a single length of an unloaded twisted pair of telephone wires. The operation of the invention is the same whether the stations 12 and 14 are connected directly together by a single length of an unloaded twisted pair of telephone wires 16, or by sections of twisted pairs 16 that extend to local telephone central offices, which are connected together through a nationwide telephone network. Regardless of the distance over which the signals are transmitted beyond the twisted pair link, full reconstruction of the video signal 55 is possible.

The preferred embodiments of the telecommunication system of the invention provide simultaneous, switchable communication of full motion color video with interactive voice and integrated data capabilities. The system employs a multiplexer switch enhancer which accommodates, redistributes and manages the bi-directional transmission of full motion color images, as well as audio and data channels as desired.

While the telecommunication system of the invention has been illustrated as transmitting and receiving a single video signal, as well as additional telephone and data signals, it is to be understood that the system is readily adaptable for the transmission and receipt of a plurality of video signals. That is, using quadrature amplitude modulation techniques the system can accommodate up to four channels of full motion, color, video instead of the single video channel with a telephone and four data channels as described in the embodiment of FIGS. 1–14*b*.

The telecommunication system of the invention provides analog communication enhancement and capability transmitted over a twisted pair of telephone wires. The system can be used for the twin wire transmission of bi-directional video, voice, data, facsimile or telexed inputs and outputs from office to office, floor to floor, within a building or complex of buildings, and between buildings, studios and stations of distance up to six thousand feet over unloaded pairs of telephone wires.

As illustrated in FIG. 1, the system can be constructed for full duplex operation. In such a system each of the stations 12 and 14 includes full transmit and receive capabilities. The telecommunication system of the invention may be either simplex, half duplex, or full duplex, and may be employed for special purposes, such as home video, paper viewing, video conferencing, security surveillance, medical and health care delivery, the monitoring of nuclear power plants, and innumerable other applications.

Undoubtedly, numerous variations and modifications of the invention will become readily apparent to those familiar with telecommunications systems. For example, the selectable contacts of Appendix A need not be soldered or plug-in connections as depicted in the drawing figures, but can be established through an EPROM. That is, the length and gauge of the wires in the twisted pair link can be programmed into the EPROM so that the appropriate contacts will be established automatically. Accordingly, the scope of the invention should not be construed as limited to the specific embodiments of the telecommunication system depicted and described, but rather is defined in the claims appended hereto.

APPENDIX A

PLUG IN STRAPS AND SOLDER BRIDGES WHICH MUST BE CLOSED FOR VARIOUS WIRE LENGTHS, GAUGES AND TYPES

| LENGTH OF LINE | LINE DRIVER 19 | SYM VIDEO TRANS 30 | CORRECT AMP 32 |
|---|---|---|---|
| 20 AWG - Polyvinylchloride Insulation (PVC) | | | |
| 1320–2475 ft | | B, A, W | G |
| 2970–4125 ft | | B, A, W | G, D, E, A |
| 4620–5775 ft | A, III, VI | T, R, B, L, V, X | G, R+, D, E, A |
| 26 AWG - Polyethylene Insulation (PE) | | | |
| 1320–2475 ft | | B, A, W | G |
| 2970–4125 ft | | T, R, B, A, W | G, R+, D, A |
| 4620–5775 ft | A, III, E, G | U, S, B, L | G, R+, D, A |
| 22 AWG - PE Insulated | | | |
| 1815–3300 ft | | B, A, W | G |
| 3960–5610 ft | | B, A, W | G, D, C+, A |
| 6270–7755 ft | A, B, III | T, R, B, L, A, W | G, R+, D, C+, A |
| 20 AWG - PE Insulated | | | |
| 2145–4125 ft | | B, A, X | G |
| 4950–6930 ft | | B, A, X | G, D, C+, E, B, A |
| 7755–9570 ft | A, B, III, VI | T, R, B, L, A, V, W, X | G, R+, D, C+, E, B, A |
| 19 AWG - PE Insulated | | | |
| 2475–4785 ft | | B, A, X | G |
| 5600–7920 ft | | B, A, X | G, D, C+, E, B, A |
| 8745–11055 ft | A, B, III, VI | B, L, A, V, W, X | G, R+, D, C+, E, B, A |
| 26 AWG - | | | |

APPENDIX A-continued

PLUG IN STRAPS AND SOLDER BRIDGES WHICH MUST BE CLOSED FOR VARIOUS WIRE LENGTHS, GAUGES AND TYPES

| LENGTH OF LINE | LINE DRIVER 19 | SYM VIDEO TRANS 30 | CORRECT AMP 32 |
|---|---|---|---|
| Paper Insulated | | | |
| 990–1980 ft | | B, A | G |
| 2310–3300 ft | | B, A | G, D, B |
| 3630–4455 ft | A, III | B, L, W | G, D, B |
| 22 AWG - Paper Insulated | | | |
| 1485–2805 ft | | B, W | G |
| 3465–4785 ft | | B, W | G, D, A |
| 5280–6600 ft | A, B, III | B, L, X | G, D, A |
| 20 AWG - Paper Insulated | | | |
| 1650–2970 ft | | B, A, W | G |
| 3630–4950 ft | | B, A, W | G, D, C+, A |
| 5610–6930 ft | A, III, VI | B, L, A, X | G, D, C+, A |
| 22 AWG - Polyvinylchloride Insulation (PVC) | | | |
| 825–1485 ft | | B, A, W | G |
| 1815–2475 ft | | T, R, B, A, W | G, D, C+, A |
| 2805–3465 ft | A, B, III, F, G | T, R, B, L, A, X | G, D, C+, A |

Notes: R+ stands alone and D stands alone - should not be read as (R + D).
R+ was used as not to confuse "R" for resistor.
C+ was used as not to confuse "C" for capacitor.
III = ROMANS 3
VI = ROMANS 6

I claim:

1. A telecommunication circuit for transmitting a broadband video signal of at least 4.5 megahertz band width over a link formed of a twisted pair of unloaded telephone wires having opposite ends, comprising:

symmetrical video transformer means coupled to one of said ends of said twisted pair link to receive and amplify said broadband video signal; and correcting amplifier means coupled to said symmetrical video transformer means for impressing on said broadband video signal an impedance proportional to the impedance in said twisted pair link and in vector opposition thereto to thereby correct said broadband video signal for impedance degradation in said twisted pair link.

* * * * *